(12) United States Patent
Tanaka et al.

(10) Patent No.: US 7,201,873 B2
(45) Date of Patent: Apr. 10, 2007

(54) FINE CHANNEL DEVICE, METHOD FOR PRODUCING THE FINE CHANNEL DEVICE AND USE OF THE SAME

(75) Inventors: Tsuyoshi Tanaka, Kanagawa (JP); Toshinori Hayashi, Kanagawa (JP); Toru Futami, Kanagawa (JP); Koji Katayama, Kanagawa (JP); Akira Kawai, Kanagawa (JP); Keiichiro Nishizawa, Kanagawa (JP)

(73) Assignee: Tosoh Corporation, Shinnanyo-shi (JP)

( * ) Notice: Subject to any disclaimer, the term of this patent is extended or adjusted under 35 U.S.C. 154(b) by 764 days.

(21) Appl. No.: 10/120,480

(22) Filed: Apr. 12, 2002

(65) Prior Publication Data

US 2002/0150503 A1    Oct. 17, 2002

(30) Foreign Application Priority Data

| Apr. 16, 2001 | (JP) | ............................. 2001-116984 |
| Apr. 16, 2001 | (JP) | ............................. 2001-116985 |
| Aug. 8, 2001 | (JP) | ............................. 2001-240872 |
| Aug. 14, 2001 | (JP) | ............................. 2001-245949 |

(51) Int. Cl.
*G01N 30/00* (2006.01)

(52) U.S. Cl. .................. 422/58; 422/50; 422/68.1; 422/82.05; 422/99

(58) Field of Classification Search ............... 422/50, 422/68.1, 82.05, 99, 100, 101, 58
See application file for complete search history.

(56) References Cited

U.S. PATENT DOCUMENTS

| 5,250,263 A | 10/1993 | Manz |
| 5,681,484 A | 10/1997 | Zanzucchi et al. |
| 5,755,942 A | 5/1998 | Zanzucchi et al. |
| 5,866,345 A | 2/1999 | Wilding et al. |
| 6,136,592 A | 10/2000 | Leighton |
| 6,167,910 B1 * | 1/2001 | Chow ......................... 137/827 |
| 6,210,986 B1 | 4/2001 | Arnold et al. |
| 6,645,432 B1 * | 11/2003 | Anderson et al. ........... 422/100 |
| 2002/0150503 A1 | 10/2002 | Tanaka et al. |

FOREIGN PATENT DOCUMENTS

| JP | 8-334505 | 12/1996 |
| WO | WO 97/21090 | 6/1997 |
| WO | WO 98/22625 | 5/1998 |
| WO | WO 99/64836 | 12/1999 |
| WO | WO 01/07506 | 2/2001 |
| WO | WO 01/70400 | 9/2001 |

OTHER PUBLICATIONS

U.S. Appl. No. 10/547,677, filed Sep. 2, 2005, Kawai et al.

* cited by examiner

*Primary Examiner*—Jill Warden
*Assistant Examiner*—Samuel P. Siefke
(74) *Attorney, Agent, or Firm*—Oblon, Spivak, McClelland, Maier & Neustadt, P.C.

(57) ABSTRACT

A device includes a first substrate having a channel formed on front and rear surfaces of the first substrate, and an information recording layer forming an optical recording medium on at least one of the front and rear surfaces of the first substrate.

15 Claims, 25 Drawing Sheets

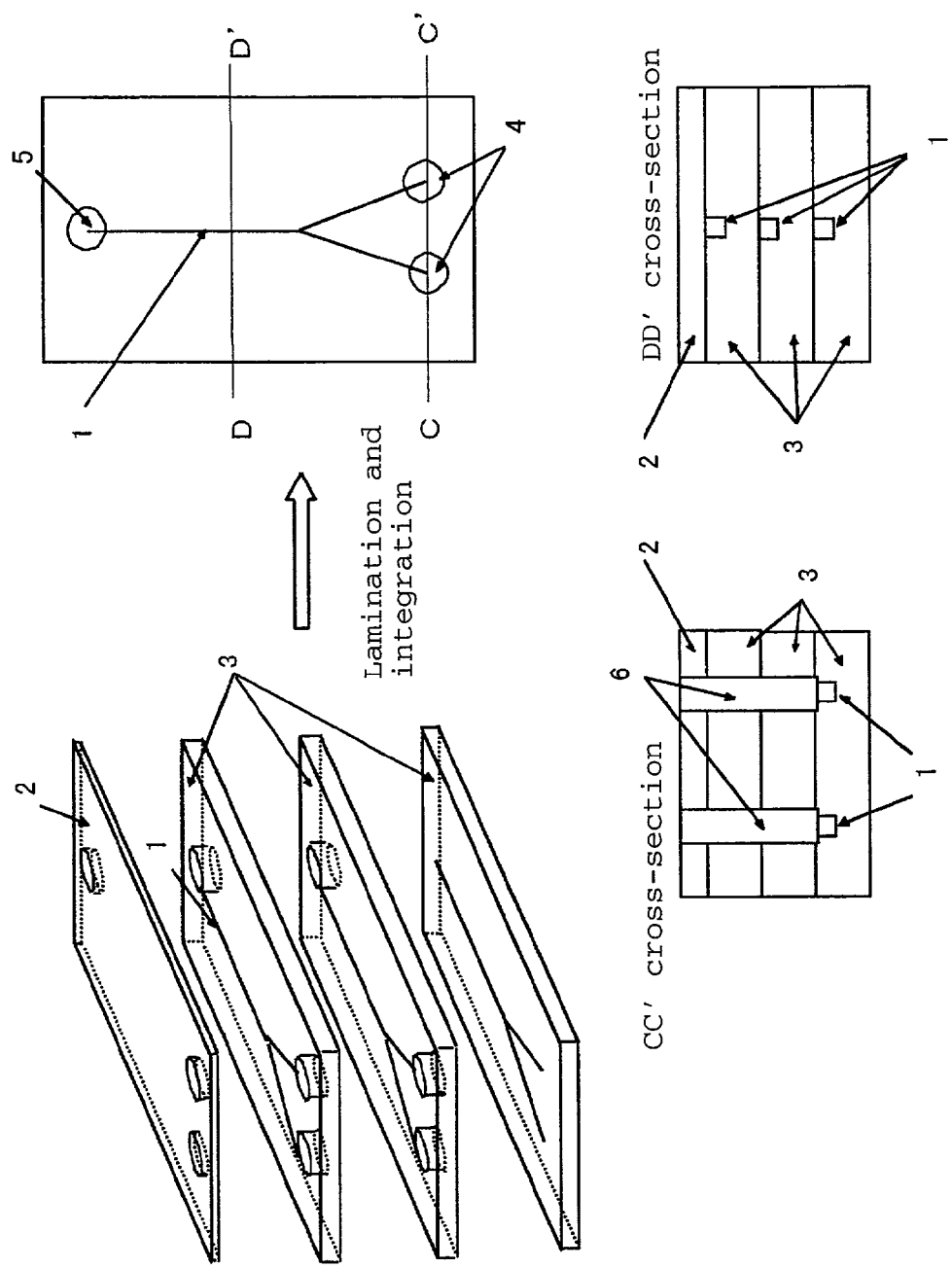

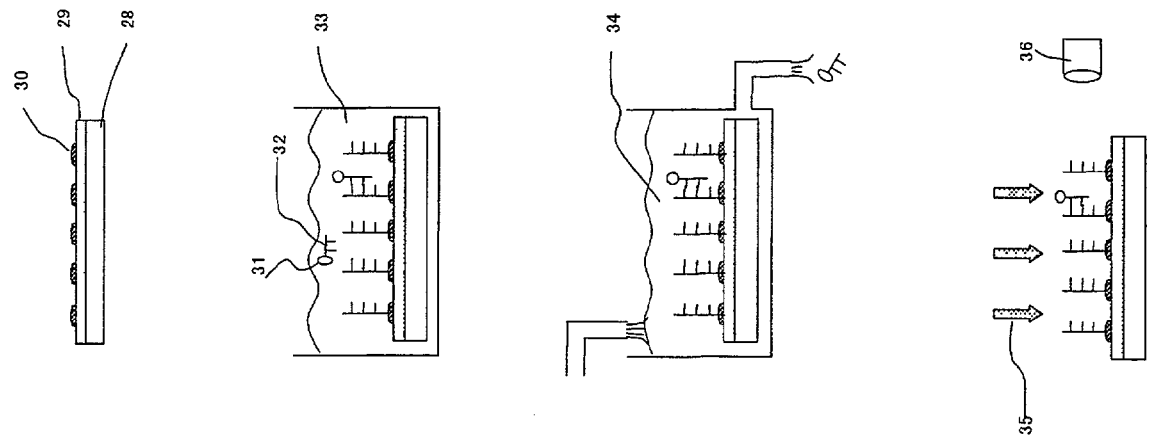
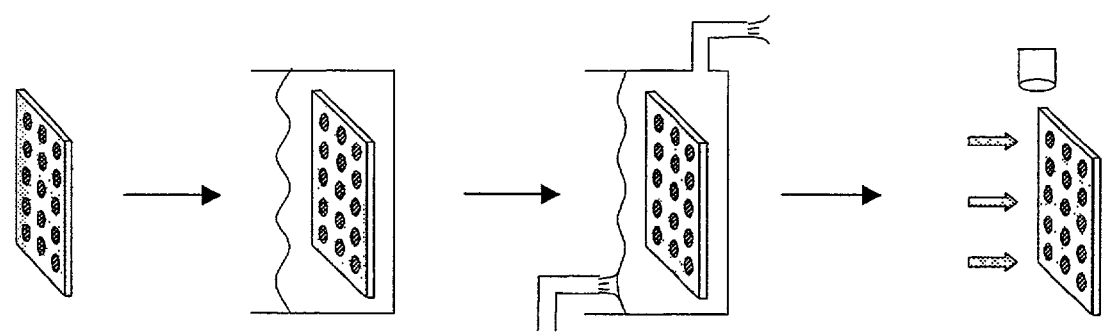
Fig.3(a)
Fig.3(b)
Fig.3(c)
Fig.3(d)

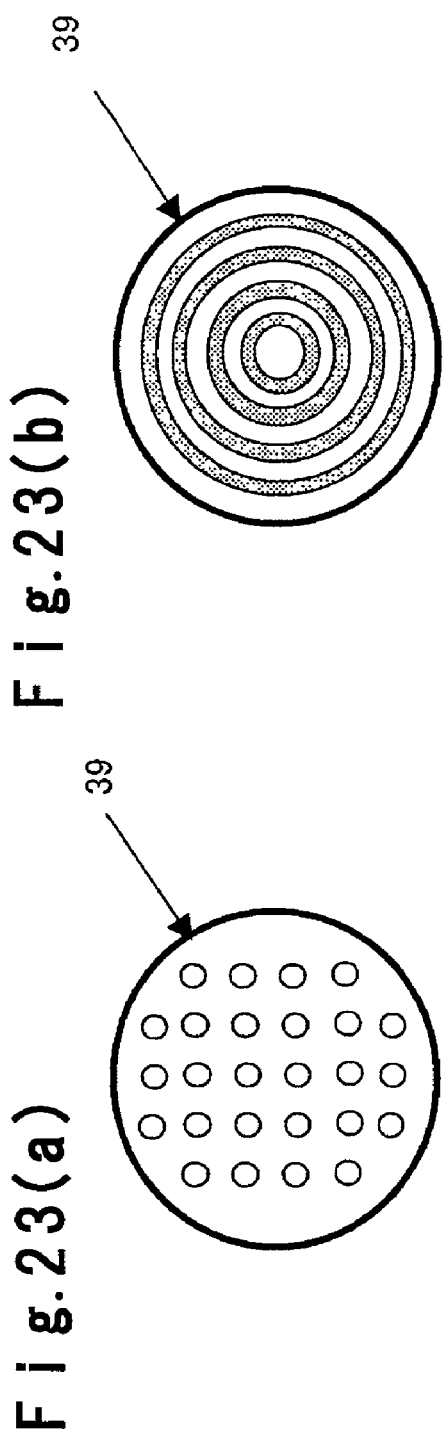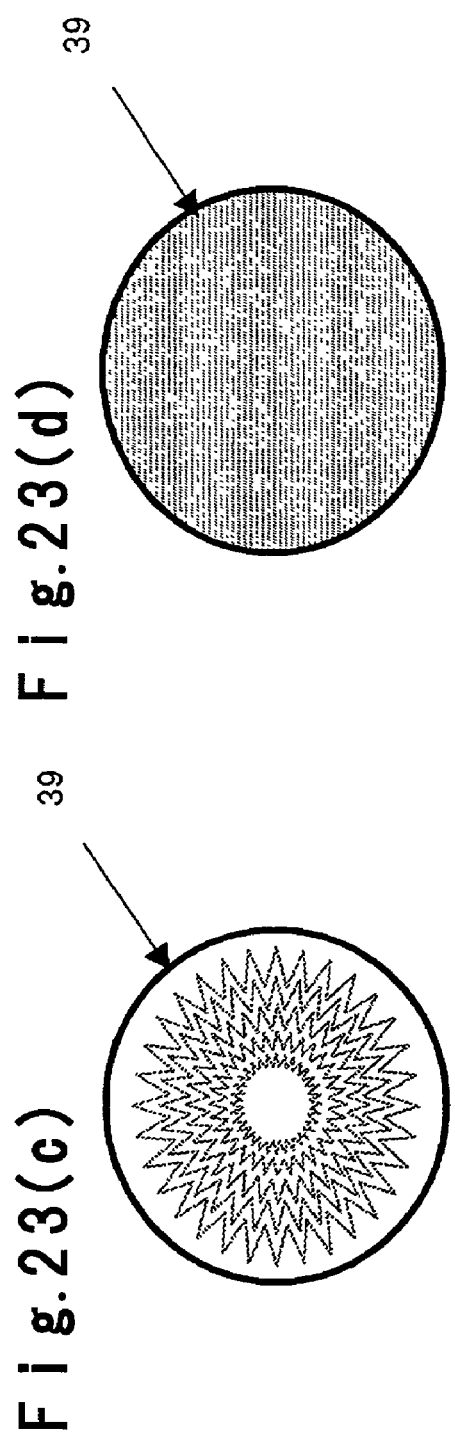
Fig.23(a) Fig.23(b) Fig.23(c) Fig.23(d)

Fig.24
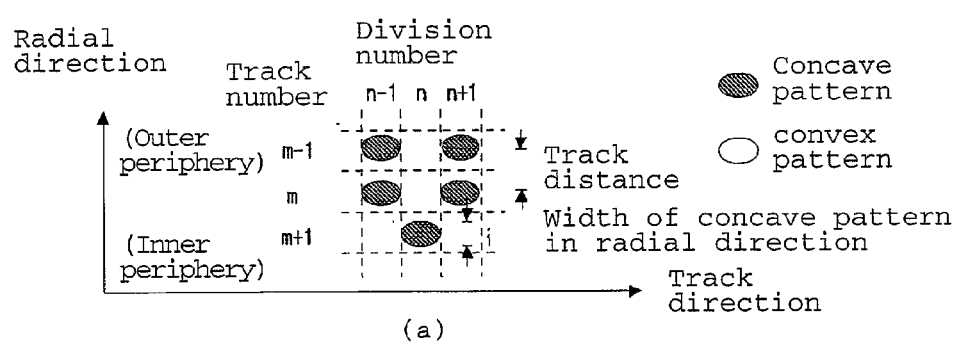
(a)
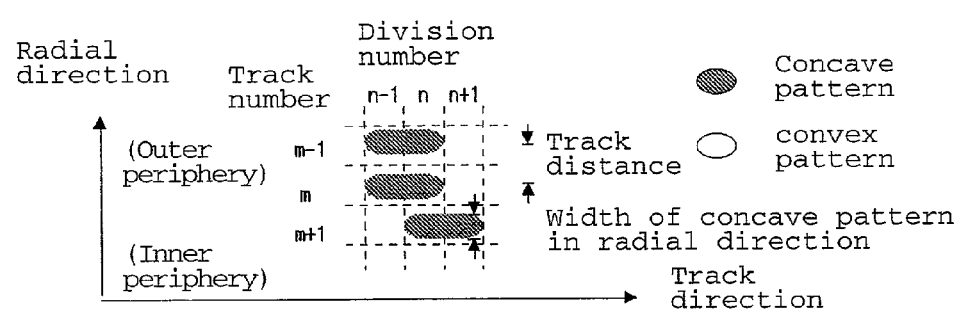
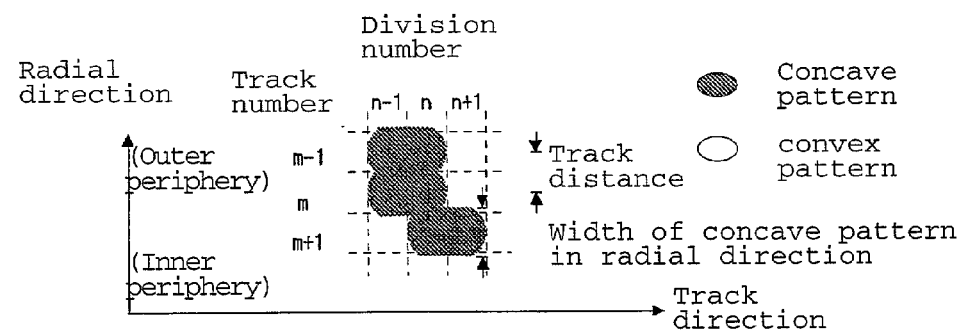

Fig.25
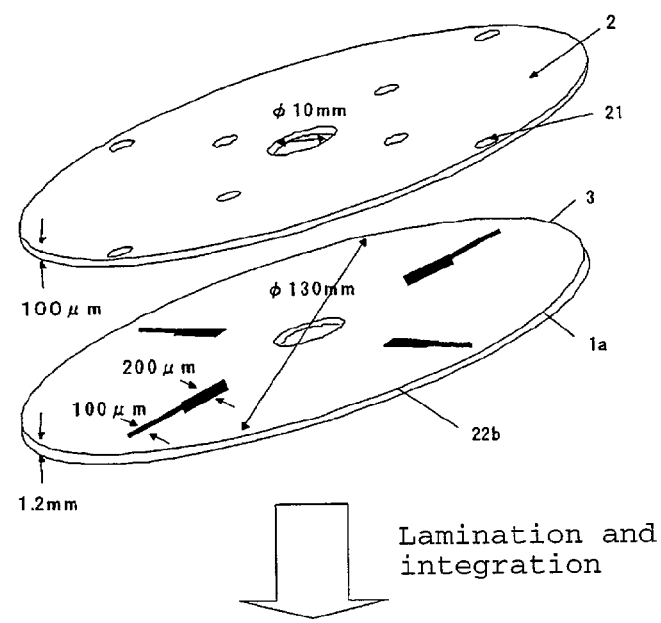
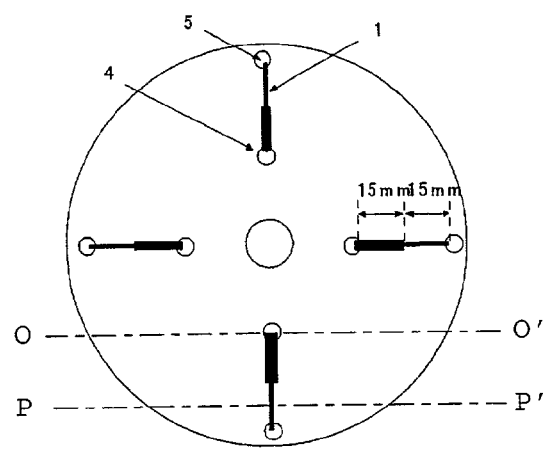
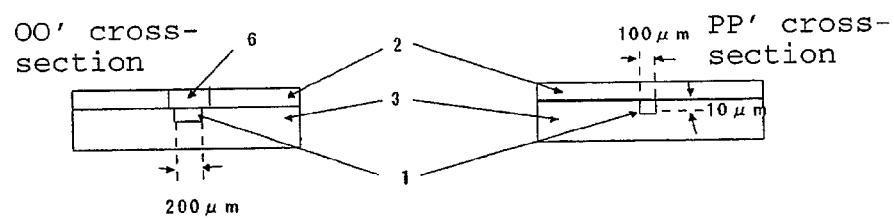

FINE CHANNEL DEVICE, METHOD FOR PRODUCING THE FINE CHANNEL DEVICE AND USE OF THE SAME

The present invention relates to a fine channel device suitable for conducting a chemical/physical manipulation of fluid such as feeding, mixing, reacting, synthesizing, analyzing, separating, extracting, detecting and so on in a fine channel, and a method for producing the fine channel device.

In recent years, a so-called integrated chemical laboratory in which a fine channel device comprising a glass substrate of several cm square provided with a fine channel having a length of several cms and a width as well as depth of sub-micrometer to several hundred micrometer scale is used and a chemical/physical manipulation of fluid such as feeding, mixing, reacting, synthesizing, analyzing, separating, extracting, detecting and so on is carried out in the fine channel, has been noted. Such integrated chemical laboratory can provide a very efficient chemical reaction due to effects of a short diffusion length of molecule and a large specific interfacial area of fine space. Further, it is expected to provide an operational consistency of reacting-separating-extracting-detecting; to provide advantages such as quickness, labor-saving, resource-saving, energy-saving and space-saving in various research and development, and to provide a possibility of reduction of waste liquid or products resulted from experiments, rationalization in repeated experiments and so on. The fine channel referred to in this description is a fine channel having a width of 500 µm or less and a depth of 300 µm or less. However, it is preferable to form a fine channel having a width of 300 µm or less and a depth of 150 µm or less in order to provide effectively the effects of a short diffusion length of molecule and a large specific interfacial area of fine space. If the width and the depth of the fine channel exceed the above-mentioned dimensions, it is difficult to provide effectively the short diffusion length of molecule and the large specific interfacial area of fine space.

Further, there has been made an attempt of applying a chemical synthesis in a fine channel to the production of industrial articles while the characteristics of the fine space in the fine channel device are maintained. In this case, use of a single fine channel device causes a result of a small yield per unit time because of its having a fine space. However, if a system comprising a large number of fine channel devices arranged in parallel can be constructed, the yield per unit time can be increased while the characteristics of the fine space are maintained. For example, there is a proposal that a plurality of fine channel devices having the same structure are prepared and a reaction solution is distributed to each of the devices, or a plurality of fine channel devices are overlaid wherein common portions such as an inlet port for a reaction solution and an outlet for a reaction product or the like are communicated with perforated vertical openings. Further, in the above-mentioned system wherein the plurality of fine channel devices operate in parallel, it is possible to achieve simultaneously analyzing, separating, extracting, detecting and so on in parallel as well as achieving a chemical synthesis.

FIG. 1 shows an embodiment of the fine channel device. In a conventional fine channel device prepared to achieve a chemical/physical manipulation such as feeding, mixing, reacting, synthesizing, analyzing, separating, extracting, detecting of fluid or the like in a fine channel, a concave-convex pattern was formed only in a single surface of a substrate (hereinbelow, referred to as the fine channel substrate) as shown in FIG. 1, and the concave-convex pattern was used as a fine channel. Accordingly, it was difficult to arrange on a single fine channel substrate three-dimensionally a functional unit having, for example, a heating function, a cooling function or the like for controlling temperature for a chemical reaction in the fine channel. The functional unit is a unit operable electrically, magnetically, physically, chemically or the like, such as a piezoelectric element, an electromagnet, electric or electronic parts, a circuit substrate having a wiring pattern on which any of these element or part is disposed, an information recording layer, a complex layer thereof, in addition to the heating function and cooling function for controlling temperature for a chemical reaction in the fine channel.

Even in a case that a plurality of fine channel devices were arranged in parallel or in lamination in order to increase the yield and an analyzable number, an effective parallel or laminated arrangement could not be obtained because the fine channel was formed only in a single surface. FIG. 2 shows an example of a conventional fine channel device formed by laminating a plurality of elements of the device. As shown in FIG. 2, since the fine channel was formed only in a single side of each substrate, the number of fine channels in the fine channel device did not exceed the number of the substrates used even though the device was formed by overlaying the substrates. Accordingly, it was necessary to use more number of substrates in order to supply a sufficient amount of fluid, with the result that it was difficult to reduce sufficiently the size of the fine channel device.

On the other hand, as a fine channel device for analyzing a specified substance, there has been used an analyzing tool (hereinbelow, referred to as an analyzing chip) for fixing enormous kinds of biomolecules such as DNA, RNA, protein or the like on a plate. In this specification, "bonding ability" in "a recognizable molecule having a bonding ability" means the nature capable of bonding another substance by the way of a hydrogen bond, coordinate bond, Vander Waals force, chemical adsorption, physical adsorption or the like. Further, the "recognizable" means the nature capable of selectively bonding a specified substance among a plurality kinds of substance due to the above-mentioned bonding ability. As an example of such "recognizable molecule having a bonding ability", a DNA fragment, RNA, enzyme, antigen, antibody, protein or the like may be mentioned. However, it should not be restricted to these.

FIG. 3 is a diagram for explaining the bonding of the recognizable molecule with an analyzed substance on the above-mentioned analyzing chip. An analyzing chip in which a recognizable molecule 30 is fixed in a form of spots on a slide glass 28 by using a binder 29 as shown in FIG. 3(a) is immersed in an analyzing liquid reagent 33 in which a substance 32 as an object of analysis (hereinbelow, referred to as the analyzed substance) is incorporated, so as to obtain the bonding. In this case, it is preferable that the analyzed substance 32 is modified with a labeled substance which can generate a detecting signal. Here, explanation will be made as to a case of using a fluorescent material as such labeled substance. If the analyzed substance capable of bonding to the recognizable molecule is in the analyzing liquid reagent, the bonding of the both substances is effected. Then, the analyzing chip is washed with a cleaning liquid 34 to wash away the analyzed substance which remains without bonding to the recognizable molecule as shown in FIG. 3(c). Then, the fluorescent material on the analyzed substance which is bonded to the recognizable molecule is excited by an excitation light 35 as shown in FIG. 3(d) whereby luminescence from the fluorescent material is detected by a photosensor 36 such as CCD to thereby detect the analyzed substance which is bonded to the recognizable molecule. Thus, in the bonding reaction between the analyzed substance and the recognizable molecule on the conventional analyzing chip, the analyzing chip was immersed in a single kind of analyzing liquid reagent to effect the bonding at a time, and the chip was washed with the cleaning liquid to wash away the analyzed substance which is not bonded to the recognizable molecule. Then, the fluorescence detection was carried out.

In the conventional technique, the binder was coated on the entire surface of a flat analyzing chip. Accordingly, when the analyzing chip was immersed in the analyzing liquid reagent at a time, a foreign substance adhered on a portion of the binder where the recognizable molecule was not fixed in a form of spots. The adhesion of the substance in such portion caused a detection noise to thereby lower the sensitivity of detection. Further, since the entirety of the analyzing chip was immersed in the analyzing liquid reagent at a time, it is impossible to analyze plural kinds of analysis at a time. Further, there was a problem that a large amount of analyzing liquid reagent was thrown away.

Further, in experiments using the analyzing chip, experiments were often conducted by repeatedly changing the recognizable molecule and the analyzed substance so as to detect the optimum bonding ability of the analyzed substance to a large variety of recognizable molecule. The presence or absence of the bonding of the analyzed substance with a recognizable molecule provides only one analysis information among many individual information. However, a useful information such as, for instance, a DNA base sequence or the like can be obtained by combining such individual information. Namely, in the experiments using the analyzing chip, it is necessary to keep individual analysis information and to combine these analysis information with a subsequently obtainable analysis information. Accordingly, a recording medium capable of recording/reading such analysis information is required. There are many kinds of information, other than the bonding ability of the analyzed substance to the recognizable molecule, such as a sample information (kinds of recognizable molecule, kinds of analyzed substance, locations for fixing a recognizable molecule on the analyzing chip and so on), an analyzing chip information (conditions of preparation, conditions of bonding, conditions of inspection and so on) and an administrator information (manufacturer's names, user's names, administrator's names and so on). These sample information, analyzing chip information and administrator information can be renewed by adding new information to the previous information for the purpose of linking and analyzing, whereby the latest analysis information is obtainable. Accordingly, it is necessary for the analyzing chip to have two kinds of information: as a first information, an analyzing chip identification information capable of identifying individual analyzing chip in order to link one with another analyzing chip information, and as a second information, information relating to a result of analyzing the analyzing chip. The generally used analyzing chip is required to be transferred to an analyzing chip producing device, a bond-experiment device, a bond-inspection device and so on separately. However, since the configuration of analyzing chips are similar, it is difficult to identify analyzing chips from their outer appearance. Accordingly, the identification of individual analyzing chip is important for an administration purpose of analyzing chip. Therefore, there is a proposal of a method for identifying an analyzing chip by using characters or bar codes, or a method for specifying an analyzing chip by using a part of a plurality of spots arranged on analyzing chips as an index for controlling the sample information as disclosed in Japanese Examined Publication No. 2000-338110. In these methods, a marker of a fluorescent material is previously formed prior to the preparation of a sample in the same manner as the case of the recognizable molecule. Accordingly, the inspection of a specimen and the evaluation of the fluorescent marker can be made with use of a single light source for specimen analysis. As described above, the method for applying an index is proposed so that individual analyzing chip can be recognized before experiments, whereby the individual analyzing chip can be identified by applying characters, bar codes, indices or the like on the analyzing chip.

However, the characters may cause error in a visual check or data input. Further, it is necessary for bar codes to employ a bar code reading device in addition to the inspection device. Further, when indices are used, there is a possibility of destruction of an index information during handling, and there is a lack of stability in holding a recorded information for a long term. Accordingly, a recording system capable of preserving information for a long term without causing error in a visual check or data input and without requiring a reading device separately, is required. Further, there are problems that the information applicable to the analyzing chip before experiments is limited to a part of information among a sample information, analyzing chip information, administrator information and so on necessary for the analyzing chip, and a large variety of analyzing chips are to be prepared because many analyzing chips can not be used for analysis experiments other than the previously held information. Further, there is also a problem that the information of a result of analysis of analyzing chips as the second information can not be recorded. Further, there is another problem that when a fluorescent material is used as an information source in the method that the analyzing chip information is described by means of indices, the information may be destructed due to the deterioration of the fluorescent material or the contact to the fluorescent material as an index at the time of handling of the analyzing chip whereby the information of the analyzing chip can not be preserved for a long term. Further, since an analysis information is recorded and preserved in an external recording medium such as a hard disk or the like so that individual analysis information can be linked with the previously recorded information, there is possibility of causing crushing of the external recording medium or overflowing of the recording capacity, whereby an important analysis information may be lost.

Further, in a conventional technique, a concave-convex pattern of fine channel in the fine channel device was formed in a substrate made of glass, silicone, metal, resin or the like by photolithography and etching with use of a photomask.

FIG. 4 is a diagram for explaining an example of the manufacturing process for a conventional fine channel device. First, a metallic film such as gold or Cr is formed on a glass substrate, and a photoresist is coated on the substrate to prepare an original plate of photoresist for exposure to light. A photomask having a pattern according to the shape of a fine channel was placed on the original plate of photoresist. Exposure to light is conducted to the original plate through the photomask followed by developing. Then, the metallic film is etched with acid, and the resist and the glass are etched with a hydrofluoric acid. Further, the metallic film is dissolved to obtain a substrate in which a fine channel is formed.

In the conventional method, however, it was necessary to prepare the substrate having the fine channel by developing through the photomask and etching one by one.

Accordingly, it took several ten minutes to several hours in order to manufacture a single substrate. Further, in order to prepare the photomask for photolithography, it was necessary to prepare photomasks of different pattern. Even in a case of slight change of pattern, a new photomask was required. For the preparation of the photomask, it took several hours to several days, and a large cost was incurred.

The proposal of the present invention is made in consideration of the disadvantages of the conventional techniques.

It is a first object of the present invention to provide a fine channel device capable of arranging three-dimensionally a functional unit having an electrical, magnetic, physical or chemical function on a substrate in which a fine channel is formed, and capable of facilitating a parallel or lamination structure.

It is a second object of the present invention to provide a fine channel device capable of recording/reading a synthesis information or an analysis information when a specified substance is synthesized or analyzed by using the fine channel device, and capable of preserving such synthesis or analysis information for a long term.

It is a third object of the present invention to provide an analyzing chip comprising a fine channel device for analyzing a specified substance, which is capable of conducting simultaneously a plurality of different kinds of analysis by using a plurality of different analyzing liquid reagents whereby the amount of an analyzing liquid reagent used can be reduced and the sensitivity of measurement for analyzing is improved.

It is a fourth object of the present invention to provide a fine channel device which can be manufactured economically in large quantities and in a short time, and a method for producing the fine channel device.

The present invention is to solve the above-mentioned problems. In accordance with a first aspect of the present invention, there is provided a fine channel device comprising a fine channel substrate having a fine channel, in which patterns of same or different concave-convex are formed in front and rear surfaces.

It is preferable that the fine channel device has at least one inlet port for introducing fluid, at least one fine channel for feeding the fluid and at least one outlet port for discharging the fluid wherein the fine channel is communicated with the inlet port and the outlet port.

In accordance with a second aspect of the present invention, there is provided a fine channel device according to the first aspect wherein a substrate having or without having perforated openings is overlaid on the fine channel substrate.

In accordance with a third aspect of the present invention, there is provided a fine channel device comprising a fine channel substrate which is provided with an optical recording medium capable of recording/reading a synthesis information or an analysis information. In such fine channel device, it is preferable that light for analyzing a specified substance or light for recording/reading information is a near field light whereby high density recording of the information of an analyzed substance is possible, and a large amount of information can be processed.

In accordance with a fourth aspect of the present invention, there is provided an analyzing chip comprising a fine channel device having a fine channel, adapted to analyzing a specified substance, wherein a recognizable molecule having a bonding ability to an analyzed substance is located at an arbitrary position in the fine channel. It is preferable that the concave-convex pattern of an inner wall of the fine channel at a position where the recognizable molecule is fixed is different from the concave-convex pattern of the inner wall of the fine channel at the other position.

Further, in accordance with a fifth aspect of the present invention, there is provided a method for producing a fine channel device which comprises injection-molding resin through a mold, in which a concave-convex pattern of fine channel is formed, to form a fine channel substrate having a fine channel as an injected product of resin in which the concave-convex pattern of the mold is transferred.

Further, in accordance with a sixth aspect of the present invention, there is provided a method for producing a fine channel device which comprises using a pair of molds each having a pattern of concave-convex shape corresponding to a fine channel formed in a fine channel substrate, and injecting resin between the pair of molds to form a fine channel substrate, as a double-side injection-molded product, in which a fine channel having a pattern of the offset concave-convex pattern with respect to that of the molds is formed in each of front and rear surfaces of the fine channel substrate. In this case, patterns of the concave-convex shape of the molds to be transferred to the front surface and the rear surface of the injected resin-molded product may be the same or different. Further, in the fine channel device produced according to the present invention, at least one surface of the fine channel substrate is curved to have the center of a radius of curvature at a side of the fine channel substrate, the radius of curvature is in a range of from 5 m to 100 m, and the surface roughness (Ra) is 0.5 nm or less.

In drawing;

FIG. 2 is a diagram showing a typical fine channel device having a multi-layered structure;

FIG. 3 is a diagram for explaining a bonding state between a substrate as an object of analysis and a recognizable molecule obtained by the conventional analyzing chip;

FIG. 23 is a diagram showing several types of recognizable molecule fixing portion in Example 5;

FIG. 24 is a diagram showing several concave-convex patterns in a substrate having a fine channel described in Example 6; and FIG. 25 is a diagram showing a fine channel device prepared in Example 6.

Figure 1:
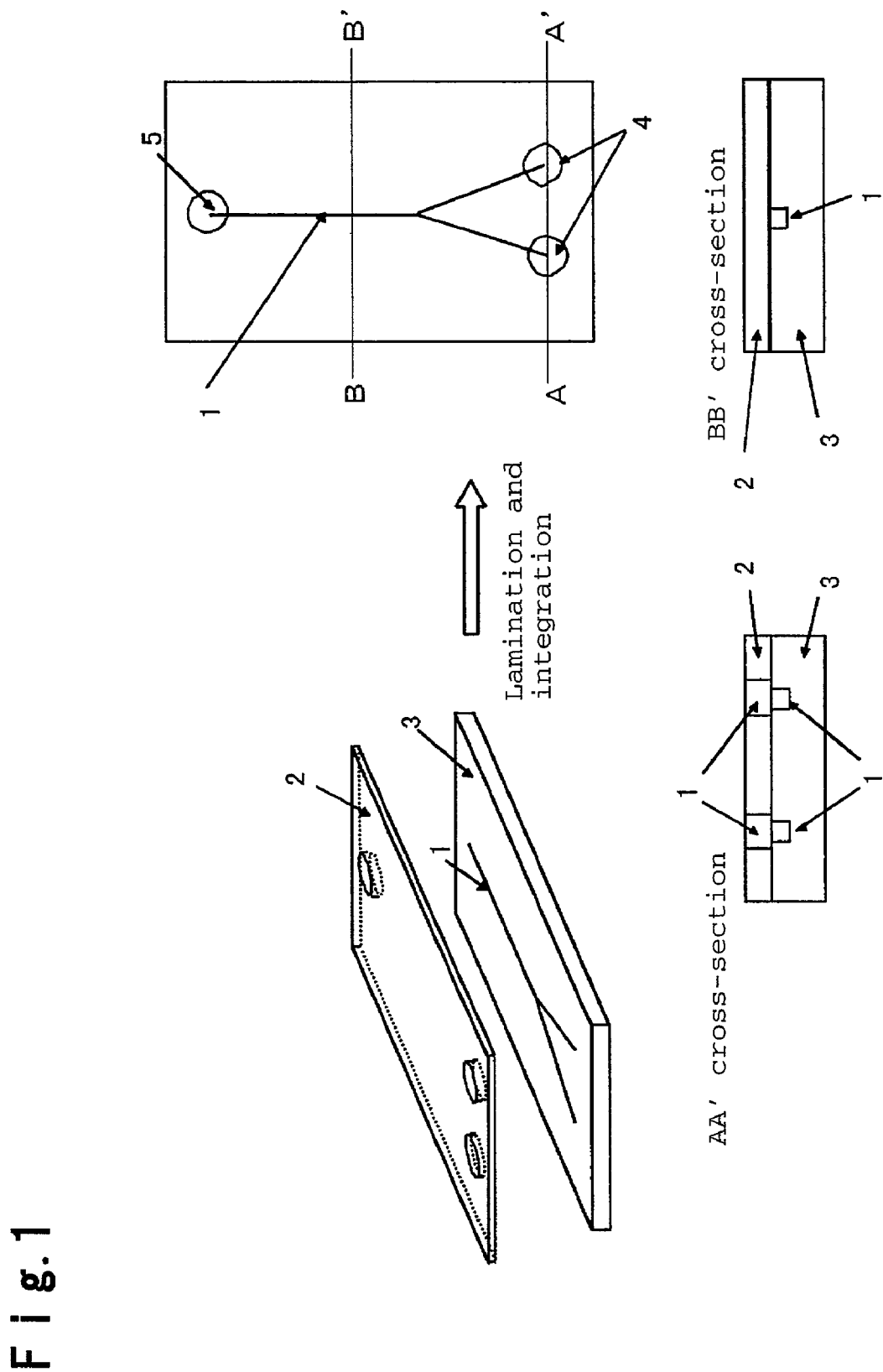
FIG. 1 is a diagram showing a typical fine channel device.
Figure 4:
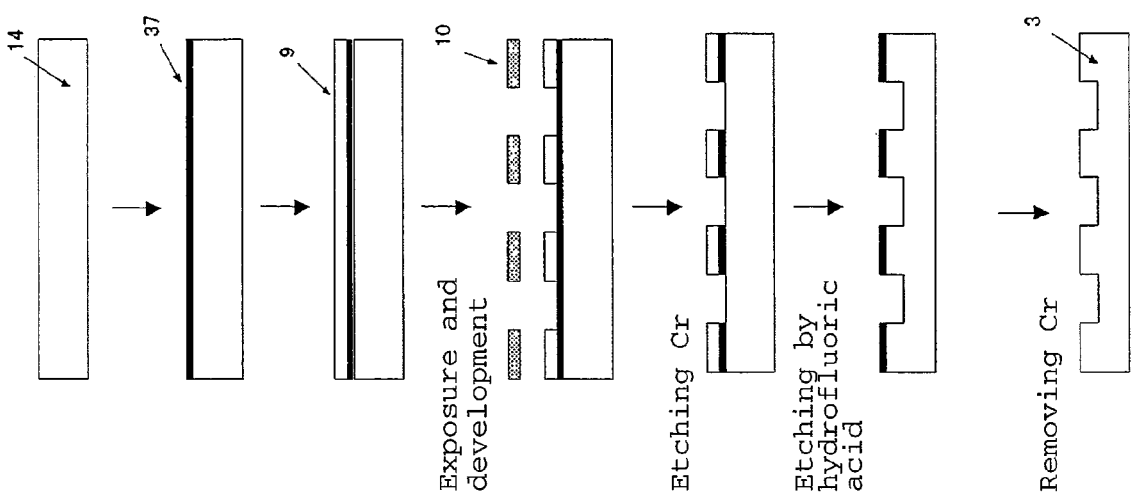
FIG. 4 is a diagram for explaining a conventional method for producing a substrate in which fine channels are formed.

In the following, the present invention will be described in more detail.

The fine channel device of the present invention comprises a fine channel substrate having a fine channel, in which patterns of same or different concave-convex are formed in front and rear surfaces. In other words, the fine channel device of the present invention comprises a fine channel substrate having front and rear surfaces in each of which a pattern of same or different concave-convex is formed wherein at least one of the front and rear surfaces provides a fine channel. In particular, the fine channel device has at least one inlet port for introducing fluid, at least one fine channel for feeding the introduced fluid and at least one outlet port for discharging the fluid wherein the fine channel is communicated with the inlet port and the outlet port. With such structure, a functional unit having an electrical, magnetic, physical, chemical function or the like can be formed three-dimensionally with respect to a fine channel formed in a substrate surface, and a fine channel in the device can be used for a chemical or physical manipulation such as the feeding, mixing, reacting, synthesizing, analyzing, separating, extracting, detecting or the like of fluid. Such an attempt can be made in such a manner that for example, one or more kinds of fluid such as gas, liquid or the like are introduced through the inlet port; the one or more kinds of fluid are mixed or reacted efficiently by a heat treatment or the like, and a resulted reaction product is discharged through the outlet port. In this specification, a substrate having a perforated opening or openings or without having any opening may be referred to as "a cover member".

The fine channel device of the present invention may be comprised of such substrate (first substrate) and another substrate (second substrate) having perforated openings or without having any opening which is overlaid on the first substrate. When a fine channel device having perforated openings at both sides is to be formed, it can be formed by overlaying second substrates each having perforated openings on both sides of one or more number of first fine channel substrates. When a fine channel device having a side which has no perforated opening is to be formed, it can be formed by overlaying a second substrate having perforated openings on a side of one or more fine channel substrates, and overlaying another second substrate having no perforated opening on the other side of the one or more fine channel substrates. Further, when a fine channel device is formed by laminating two or more first fine channel substrates, it can be formed by inserting second substrates each having perforated openings between first fine channel substrates.

Further, in the fine channel device of the present invention, an inlet port and an outlet port may be formed at its one side, and a specified material e.g., metal such as Ni or Cr, an alloy such as a Ni—Cr alloy or ceramics may be located at the other side. In this case, the fine channel device can be formed by using a lamination technique so that a fine channel substrate embedded with metal, an alloy or ceramics is placed on a side of the device and a substrate having the inlet port and the outlet port as perforated openings is placed on the other side of the device. It goes without saying that the fine channel device can be formed by overlaying two or more fine channel substrates. Further, the metal or alloy arranged in the fine channel device can be used as a heating source for accelerating a chemical reaction.

The concave-convex pattern formed in a fine channel substrate may have a desired shape according to a specific object by using any method as described in Examples. Further, in the concave-convex pattern formed in the rear surface of a substrate, a functional unit having an electrical, magnetic, physical or chemical function which serves heating or cooling for controlling chemically reacting conditions in the fine channel can be disposed three-dimensionally with respect to the fine channel of the substrate surface. Further, when the fine channel device is formed to have a parallel or lamination structure in order to increase the yield or the number of analysis, the fine channel can be formed in both surfaces of a substrate wherein a concave-convex pattern in a rear surface of the substrate is used as a fine channel in the same manner as the fine channel formed in a front surface of the substrate, and a cover member is overlaid on a side of rear surface of the substrate. In this case, the parallel or lamination structure is obtainable efficiently in comparison with a fine channel substrate in which a fine channel is formed only in a single surface of the substrate. Further, when the rear surface of a substrate is used to have function of the fine channel device, the shape of the fine channel may be the same as or different from the shape of the fine channel formed in the front surface. Thus, the above-mentioned chemical or physical manipulation can effectively be conducted by forming patterns of same or different concave-convex shape in the front and rear surfaces of the fine channel substrate.

For the substrate and the cover member, it is desirable to use a material which enables the fabrication of a fine channel easily and has an excellent chemical resistance and a proper rigidity. For example, glass, quartz, ceramics, silicone, metal or resin may be used. the size and the shape of the substrate and the cover member are not in particular limited. However, from the viewpoint of forming the fine channel device, the substrate and the cover member preferably have a rectangular shape having a width of 50 mm or less and a length of 80 mm or less, or a circular shape having a diameter of 150 mm or less, each having a thickness of several mm or less, for example. The cover member is provided with small openings for communicating the fine channel with an exterior portion of the fine channel device. When the small openings are used as an inlet port and/or an outlet port for fluid, it is desirable that the diameter of the small openings is several mm or less, for example. The small openings of the cover member can be formed chemically, mechanically or using any means such as laser irradiation, ion etching or the like.

In the fine channel device of the present invention, a perforated opening may be formed at a predetermined position or positions in the fine channel substrate. Further, the fine channel device or the fine channel substrate is adapted to be used as a single body or to have a multi-layered structure. In this case, a substrate and a cover member or a plurality of substrates can be laminated by means of pressure bonding, heat bonding or adhesion bonding using an adhesive such as a photo-setting resin or a heat-setting resin. Further, when a plurality of substrates are laminated, it is possible to connect fine channels in a vertically laminated substrates by forming perforated openings at a predetermined position in the fine channels formed in the substrates.

Generally, the size of the fine channel is 500 µm or less in width and 300 µm or less in depth. However, it is preferable that the width is 300 µm or less and the depth is 150 µm or less because an efficient chemical reaction can be obtained due to effects of a short diffusion distance of molecule and a large specific interfacial area of fine space. On the other hand, there is in particular no restriction of the size of the concave-convex pattern if such pattern is used for purposes other than the fine channel.

As shown in FIG. 5, the fine channel device 38 of the present invention may have an optical recording medium capable of recording/reading a synthesis information or an analysis information, on the fine channel substrate for constituting the fine channel device 38. For the optical recording medium, a substrate on which an information recording layer 24 is formed two-dimensionally may be laminated on a fine channel substrate having a fine channel; an information recording layer 24 may be formed on a rear surface of a fine channel substrate having a front surface in which a fine channel is formed, or an information recording layer 24 may be formed in the same plane of a fine channel substrate in which a fine channel is formed. Thus, the optical recording medium can record in the fine channel device a first information for identifying individual fine channel device and a second information as a synthesis information or an analysis information obtained by using the fine channel device, e.g., a synthesizing stock information, a synthesis condition information, a synthesis material information, an analysis substance information, an analysis condition information, an analysis result information, an administrator information and so on. Thus, the fine channel device capable of reading a recorded information; capable of reading correctly the information of individual fine channel devices without requiring a separate reading device; capable of recording a result of synthesis or analysis before or after the synthesis or analysis obtained by using the fine channel device, and capable of preventing the destruction of the information and preserving recorded data for a long term.

The information recording layer used in the fine channel device having the optical recording medium of the present invention may be an information recording layer usable for an optical disk or the like. There are, for example, (1) a read-only type (CD, LD, CD-ROM, photo-CD, DVD-ROM or the like) (2) a write-once type capable of recording once (CD-R, DVD-R or the like) and (3) a rewritable type capable of recording and erasing again and again (a magneto-optical or phase change disk, MD, CD-RW, DVD-RAM, DVD-RW or the like), which can be used according to purposes.

Further, in the above-mentioned, means for analyzing a specified substance may be fluorescence analysis, and light from a light source for effecting the recording or reading of information in the optical recording medium may be used as an excitation light for fluorescence analysis. In this case, a light source for analysis and a light source for recording or reading information can be used in common, whereby the construction of an analyzing device can be simplified.

When an analyzing light for analyzing a specified substance or an information recording/reading light for recording/reading information is a near field recording light obtained by using a solid immersion lens head, a large amount of information for specified substances to be analyzed can be recorded with a high density, and a large amount of information can effectively be processed by the fine channel device. In this case, it is necessary to bring the optical head to a distance of 100 nm or less from the substrate surface because the optical head moves in a flying state above a front surface or a rear surface of the fine channel device so that the detection or the recording/reading of information can be conducted. Accordingly, in order to obtain stable flying characteristics so as not to cause the contact of the flying head to the substrate surface, it is preferable that at least one surface of the fine channel substrate is curved to have the center of a radius of curvature at a side of the fine channel substrate wherein the radius of curvature is from 5 m to 100 m, and the surface roughness (Ra) of the curved surface is 0.5 nm or less. If the radius of curvature or the surface roughness (Ra) of the substrate exceeds the above-mentioned value, it is difficult to obtain stable flying characteristics so that the optical head does not contact with the substrate surface having a fine channel when the optical head is moved in a flying state above the substrate surface at a distance of 100 nm or less.

Figure 5A:
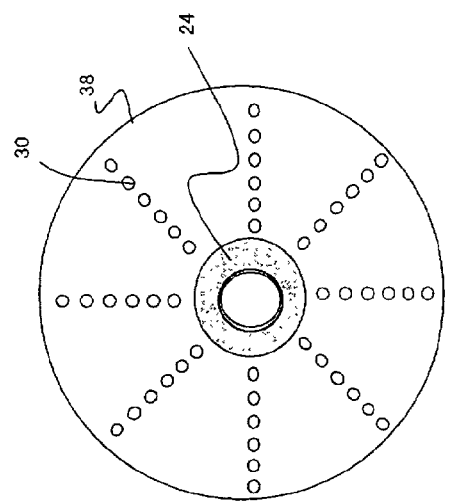
FIG. 5 is a diagram showing several types of fine channel device with an optical recording medium capable of recording or reading information.
Figure 5B:
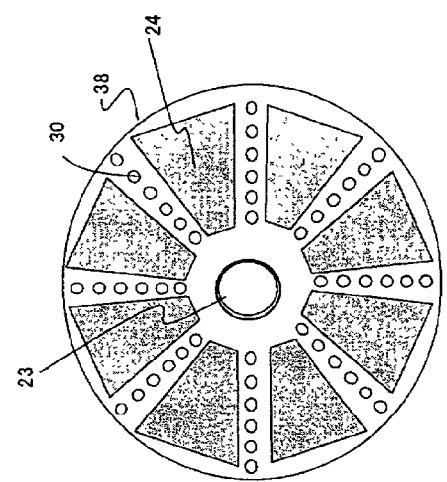
Figure 5E:
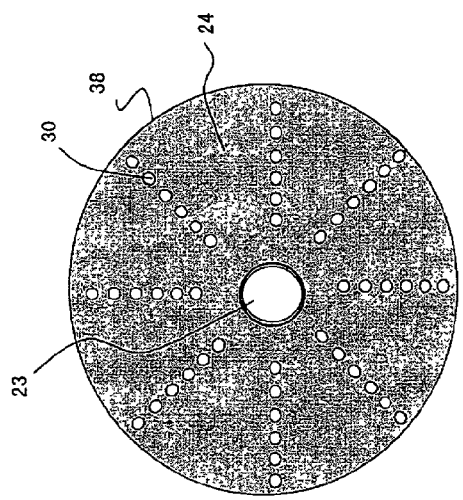
Figure 5D:
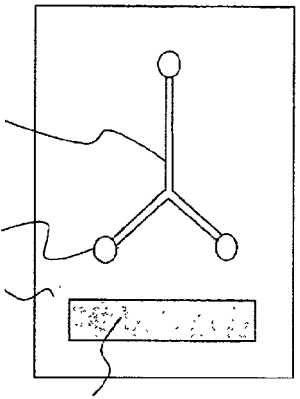
Figure 5C:
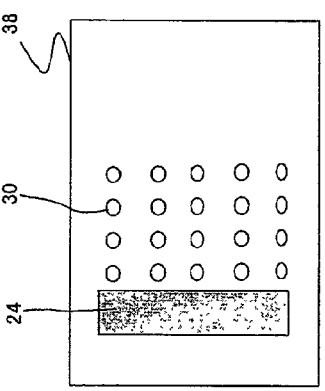

FIG. 5 shows several types of fine channel device 38 having an optical recording medium according to the present invention. FIG. 5(*a*) shows a fine channel device 38 having a circular disk-like shape in which a hub 23 for supporting rotatably the fine channel device is formed at its center, and an information recording layer 24 is formed on the entire surface including positions where an analyzed substance is located in a form of spots. FIG. 5(*b*) shows a fine channel device 38 having a circular disk-like shape in which a hub 23 for supporting rotatably the fine channel device 38 is formed at its center, and an information recording layer 24 is formed in the region other than the positions where the analyzed substance is located in a form of spots. FIG. 5(*c*)

shows a fine channel device 38 having a circular disk-like shape in which a hub for supporting rotatably the fine channel device is formed at its center, and an information recording layer 24 is formed in an inner periphery from the position where the analyzed substance is located in a form of spots. FIG. 5(d) shows a fine channel device 38 having a rectangular shape in which an information recording layer 24 is formed in the region other than the position where an analyzed substance is located in a form of spots. FIG. 5(e) shows a fine channel device 38 having a rectangular shape in which a fine channel 1 as a reaction route is formed and an information recording layer 24 is formed in the region other than the fine channel. FIGS. 5(a) to 5(e) show several types of fine channel device having an optical recording medium. However, the present invention is not limited thereto.

FIG. 6 shows an embodiment of the fine channel device used for analyzing a specified substance, according to the present invention. In FIG. 6, the surface having fine channels 1 of the fine channel substrate constituting the fine channel device may be laminated integrally with a cover member or may not be provided with a cover member. As shown in FIG. 6(a), it is possible to supply an analyzing liquid reagent to a predetermined position of the fine channel device by forming in the fine channel device at least one liquid inlet port 40, at least one fine channel 1, at least one recognizable molecule fixing portion 39 arranged at an arbitrary position or positions in the fine channel 1 and at least one liquid outlet port 41. With such arrangement, the analyzing liquid reagent can be supplied to each fine channel without the necessity of immersing the whole fine channel device in the analyzing liquid reagent. Accordingly, a plurality of different analyzing liquid reagents can be supplied to each fine channel so that a plurality of different kinds of analysis can be conducted simultaneously. Since the amount of a usable analyzing liquid reagent can correspond to the capacity of each fine channel, the amount of the usable analyzing liquid reagent can be minimized in comparison with the case that the fine channel device is entirely immersed in the analyzing liquid reagent.

Further, the shape of concave-convex pattern of an inner surface of the fine channel at the location where the recognizable molecule is fixed may be different from the shape of concave-convex pattern of the inner surface of the fine channel at another location so that the surface roughness or the surface area of the inner surface of the fine channel may be increased. With such measurements, undesirable separation of the recognizable molecule can be prevented, and many recognizable molecules can be fixed to recognizable molecule fixing portions at the inner surface of the fine channel, whereby the sensitivity of fluorescent measurement can be improved.

Figure 6A:
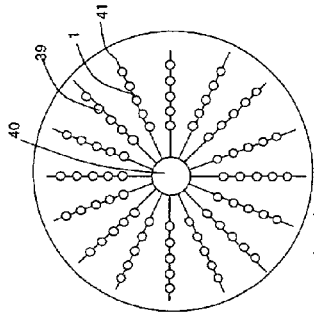
FIG. 6 is a diagram showing several types of fine channel device used for analyzing a specified substance according to the present invention.
Figure 6B:
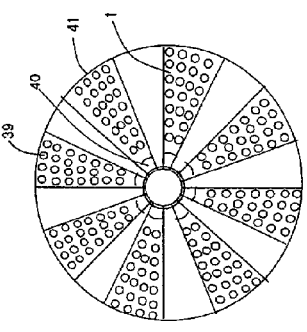

The group geometry such as the width and/or the depth of a channel may be changed in the distance from its one end to the other end so as to match a plurality of analyzing liquid reagents having different viscosity, surface tension, affirmity with the inner surface of fine channel and so on. Further, when plural kinds of fine channels are provided in a single fine channel device, a much amount of liquid reagent can be used as an experimental solution. In case that there is difficulty in moving an analyzing liquid reagent due to its having a very high surface tension or the like, a fine channel having a sectorial shape should be formed as shown in FIG. 6(b) so that the flow of the analyzing liquid reagent becomes easy. FIG. 6 shows some examples of the fine channel substrate constituting the fine channel device, which shows a fine channel substrate having a circular disk-like shape wherein linear channels 1 are extended radially from its center as shown in FIG. 6(a); a fine channel substrate having a circular disk-like shape wherein channels 1 are extended in a sectorial form from its center as shown in FIG. 6(b); a fine channel substrate having a circular disk-like shape wherein curved channels 1 are extended from its center as shown in FIG. 6(g); a fine channel substrate having a rectangular shape in which channels 1 are extended in parallel to each other as shown in FIG. 6(e), and a fine channel substrate having a rectangular shape in which liquid inlet ports 40 are located at alternate positions as shown in FIG. 6(f). However, the present invention is not limited to the above-mentioned patterns.

Figure 6C:
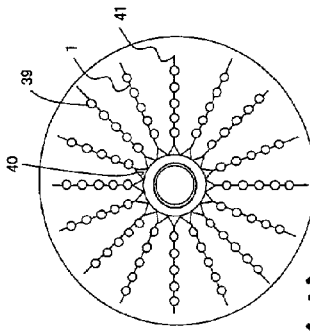
Figure 6D:
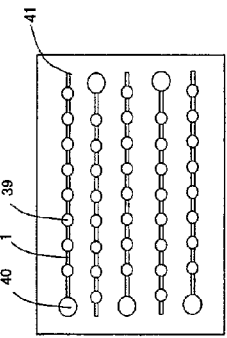
Figure 6E:
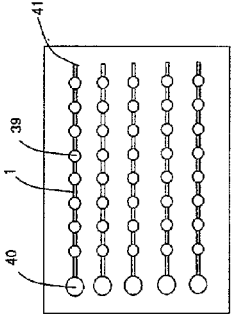
Figure 6F:
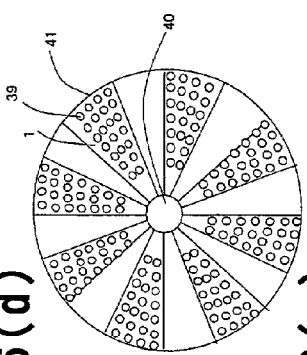
Figure 6G:
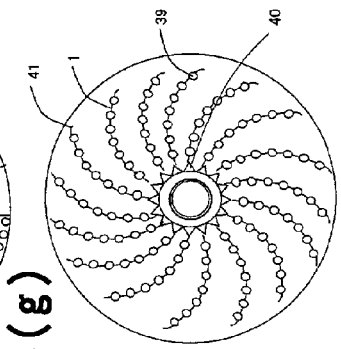

As shown in FIG. 6(c) and FIG. 6(d), the fine channel devices each having the circular disk-like fine channel substrate in which fine channels 1 are extended radially from its center has such advantage that when an analyzing liquid reagent is supplied to all channels 1 in common, the liquid inlet port 40 can be used for all channels in common. Further, the fine channel substrate having a circular disk-like shape can be equipped with a hub at its center so that the fine channel device can be rotated, and a centrifugal force can be utilized in supplying liquid from the liquid inlet port 40 to each fine channel. Further, the fine channel substrate shown in FIG. 6(f) wherein the liquid inlet ports 40 are arranged alternately allows an arrangement of fine channels 1 having recognizable molecule fixing portions with a high density.

A substrate having both surfaces in which a fine channel and a concave-convex pattern serving a function other than the fine channel can be prepared by processing directly both surfaces of a substrate material such as glass, quartz, ceramics, silicone, metal, resin or the like by laser or etching. In case that ceramics or resin is used for the substrate material, the both surfaces of the substrate can simultaneously be formed by injection-molding with use of molds for front and rear surfaces each having the offset concave-convex pattern with respect to the concave-convex pattern to be formed in the front and rear surfaces of a molded product.

Figure 7:
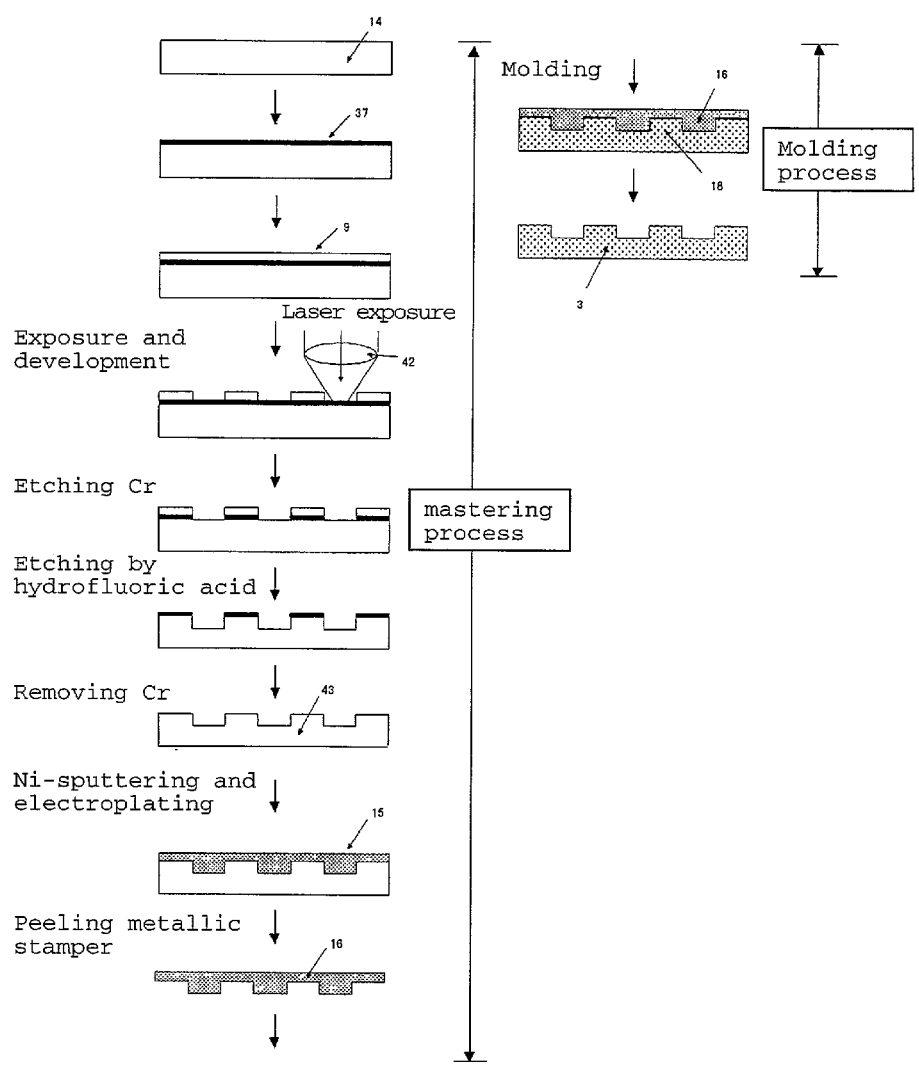
FIG. 7 is a diagram for explaining a first method for producing a substrate in which fine channels are formed, according to the method of the present invention.

FIG. 7 is a diagram for explaining a first example of the manufacturing process for preparing a substrate having a fine channel according to the present invention. The manufacturing process comprises a mastering process and a molding process. In the mastering process, a metallic film 37 such as gold or Cr is formed on an original glass plate 14 having a circular disk-like shape. A photoresist 9 is coated on the glass plate 14 to prepare an original photoresist plate for light exposure. In this case, the coated photoresist may be a photoresist in liquid form to be coated or a sheet-like photoresist to be bonded. Then, the original photoresist plate is rotated, and laser light focused to form a small spot by using an objective lens 42 is irradiated under an ON/OFF control according to a predetermined concave-convex pattern whereby light exposure is conducted to the original photoresist plate. Then, developing is conducted. Here, a device for irradiating laser light under an ON/OFF control according to a desired concave-convex pattern, the laser light being focused to a fine spot by using an objective lens, is referred to as a laser light exposure device. A control signal for turning-on or off the laser light according to a desired concave-convex pattern can be produced by a pattern generator connected to the laser light exposure device. Then, the metallic film 37 is etched with acid; the photoresist and the glass are etched by a hydrofluoric acid, and the metallic film is dissolved whereby an original glass plate 43 having a front surface in which a predetermined concave-convex pattern is formed, can be obtained. The sputtering of metal such as Ni or the like is conducted to the original glass plate 43 having the concave-convex pattern. Further, the sputtered metal is electroplated into a plate form to obtain an electroplated layer of Ni 15. The plate-like metal (the electroplated layer) is peeled off from the original glass plate 43 to thereby prepare a metallic stamper 16 having the offset concave-convex pattern with respect to a desired concave-convex pattern. In the molding process, the metallic stamper 16 formed in the mastering process is used to form a molded product made of resin or the like. Thus, a substrate 3 in which a fine channel is formed can be prepared. In this case, a usable resin may be a heat-setting resin or a photo-setting resin. Further, two metallic stampers obtainable in the mastering process may be used as a pair. By using the paired stampers, a substrate made of resin having front and rear surfaces having a fine channel or a concave-convex pattern usable for an another object may be formed by double-sided injection-molding at a once.

As another method for forming a concave-convex pattern in the original glass plate of the above-mentioned example, the original glass plate can directly be cut or shaved by using an excimer laser or the like.

Figure 8:
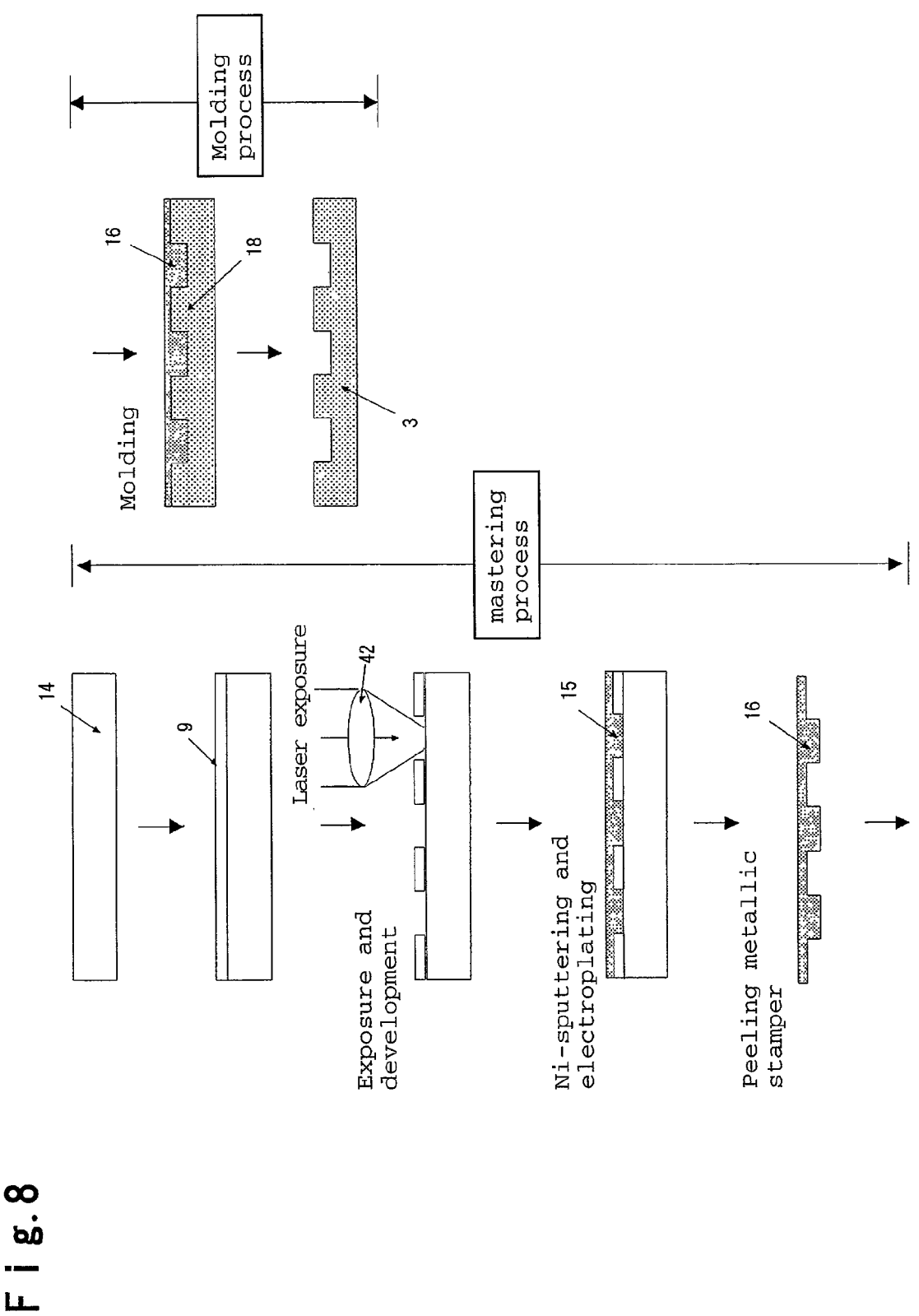
FIG. 8 is a diagram for explaining a second method for producing a substrate in which fine channels are formed, according to the method of the present invention.

FIG. 8 is a diagram explaining a second example of the manufacturing process for manufacturing a substrate having a fine channel according to the present invention. The manufacturing process comprises a mastering process and a molding process in the same manner as in the first example. In the mastering process, a photoresist 9 is directly coated on an original glass plate 14 having a circular disk-like shape. In this case, the photoresist 9 may be a photoresist in a liquid form to be coated or a sheet-like photoresist to be bonded. Then, the original photoresist plate 14 is rotated, and laser light from a laser light exposure device, which is focused to a fine spot by using an objective lens 42, is irradiated to the original photoresist plate, whereby light exposure to the photoresist layer 9 is conducted. After the light exposure to the photoresist layer 9, the photoresist is developed to obtain a photoresist surface in which a predetermined pattern of concave-convex shape is formed. The sputtering of metal 15 such as Ni or the like is conducted to the resist surface having a predetermined concave-convex pattern, and then, the metal is electroplated in a form of plate. Then, the plate-like metal is peeled off from the original glass plate 14 to prepare a metallic stamper 16 having an offset concave-convex pattern with respect to a finally obtainable concave-convex pattern. In the molding process, a molded product made of a material such as resin or the like is produced by using the metallic stamper 16 prepared in the mastering process to thereby prepare a substrate 3 having a fine channel, in the same manner as the first example. The usable resin may be a heat-setting resin or a photo-setting resin. Further, two metallic stampers formed in the mastering process may be prepared for a front surface and a rear surface. These two stampers are paired so that the both surfaces of the resinous substrate having a fine channel or a concave-convex pattern usable for another purpose may be formed by double-sided injection-molding at a once.

In the above-mentioned first and second examples, light exposure is conducted while the original photoresist plate is rotated. However, there is another technique that the original photoresist plate is placed on an X-Y stage to be moved linearly in an X-axis direction or a Y-axis direction and laser light is irradiated to the original photoresist plate to conduct light exposure to thereby form a desired concave-convex pattern.

Thus, by preparing the substrate having a fine channel by the injection-molding of resin, a molding time per one substrate can be reduced to several ten sec. Accordingly, the time of manufacturing the substrate can remarkably be shortened in comparison with the conventional technique wherein a substrate having a fine channel was prepared by developing with a photomask followed by etching one by one, and therefore, it took a time from several ten min to several hr in order to prepare a single substrate. Accordingly, it becomes possible to prepare the substrate having a fine channel in a short time and in a large scale. Further, in the present invention, when the stamper usable for forming the substrate having a fine channel by injection-molding is to prepare, a pattern of concave-convex shape which corresponds to the concave-convex pattern of the fine channel can be formed in the stamper as follows. An information of concave-convex pattern which corresponds to the concave-convex pattern of fine channel is input into a pattern generator. The pattern generator converts such information into electric signals, and the electric signals are supplied to the laser light exposure device. Laser light from the laser light exposure device is turned-on or off according to the electric signals whereby a desired concave-convex pattern can be formed. According to this technique, it is unnecessary to use a photomask usable for pattern formation, and therefore, working for the photomask can be omitted.

In the following, description will be made in detail as to a method for forming a pattern of concave-convex shape corresponding to the concave-convex pattern of a fine channel with use of a laser light exposure device while an original photoresist plate applied with a photoresist is rotated.

Figure 9:
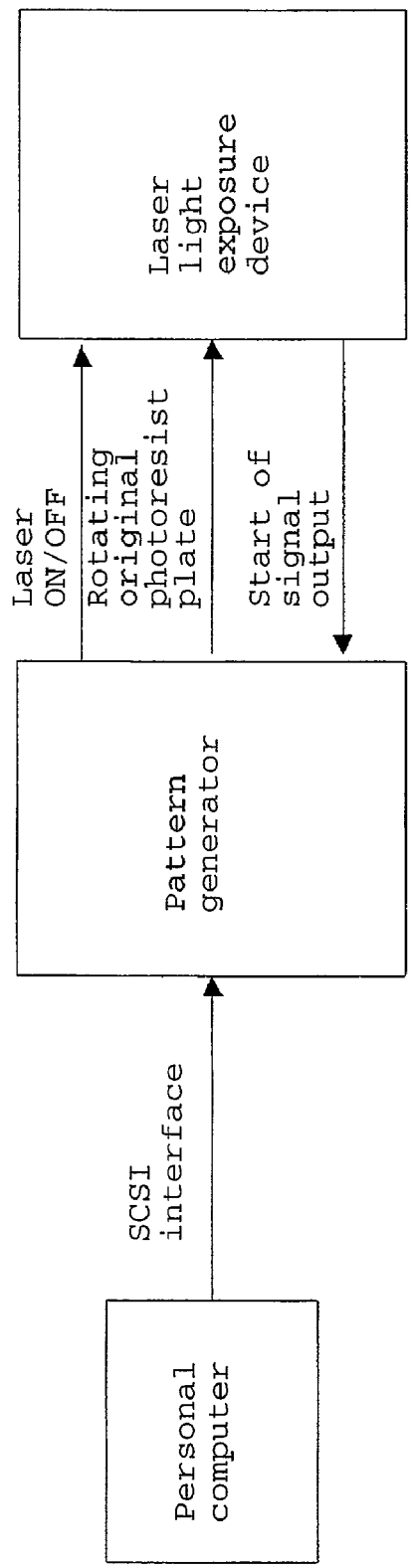
FIG. 9 is a diagram showing an embodiment of a laser light exposure system usable for producing the substrate having fine channels.

FIG. 9 is a diagram showing an embodiment of a laser light exposure system for producing a stamper usable for injection-molding resin so that a substrate having a fine channel is formed. In the embodiment shown in FIG. 9, the laser light exposure system comprises a laser light exposure device, a pattern generator and a personal computer. The laser light exposure system of the present invention may include function as the personal computer in the pattern generator, or the laser light exposure device may include a combined function of the pattern generator and the personal computer. Accordingly, the present invention is not limited to the embodiment of the laser light exposure system shown in FIG. 9.

The information of a pattern of concave-convex shape which corresponds to that of fine channel formed in a substrate is inputted to the pattern generator through the personal computer connected to the pattern generator. Pattern data are provided by digital signals consisting of "1" and "0". For example, a concave shape is designated by "1" and a convex shape is designated by "0".

When an original photoresist plate having a circular disk-like shape is used, a location in the pattern formed on the original photoresist plate is determined by a coordinate formed by a radial direction axis and a circumferential direction axis. A coordinate point in a radial direction is designated by a track number counted from an inner circumferential side or an outer circumferential side of the original photoresist plate having a circular disk-like shape wherein the length in a radial direction is divided by a plurality of concentrical tracks with respect to the center of the circular plate. A coordinate point in a circumferential direction is designated by a division number of a divided portion counted from a reference position wherein a track is divided by a predetermined number of division, and the reference position in a circumferential direction of the track is assigned by a division number of "0". In the description thereafter, every divided portion is referred to as a divisional unit.

Figure 10:
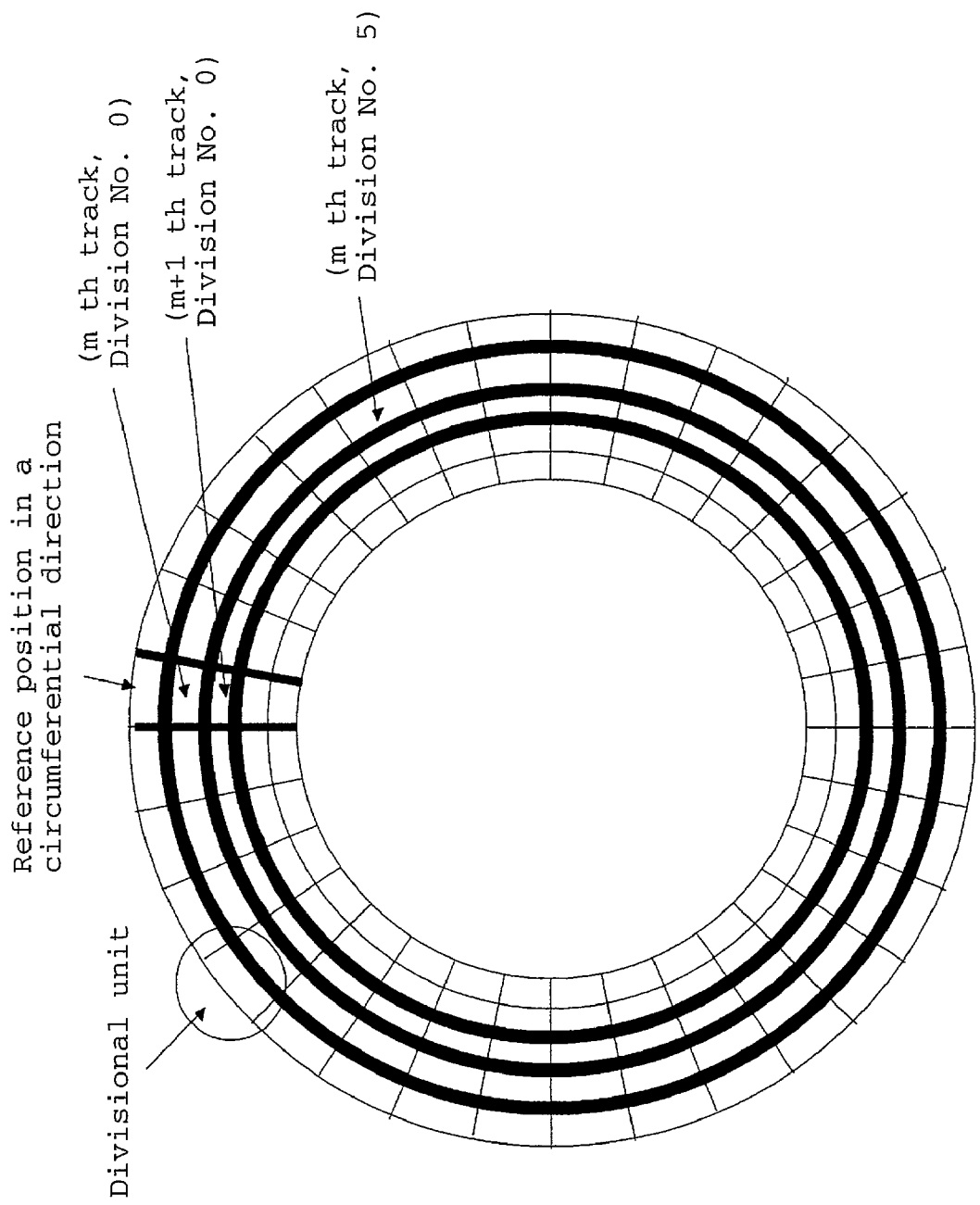
FIG. 10 is a diagram showing an embodiment of a coordinate data indicating pattern data positions obtainable by a personal computer input.

FIG. 10 shows an example of coordinate data showing positions of pattern data to be inputted from the personal computer. In FIG. 10, the track number in the outermost circumferential track was determined to be "0". The number of division in a circumferential direction was 32, and division numbers were designated clockwisely.

Pattern data inputted from the personal computer are transferred to the pattern generator. The pattern generator rotates the original photoresist plate coated with a photoresist to be exposed to light by the laser light exposure device at a predetermined period.

This period of rotation is divided by the predetermined number of division per track, which is determined at the time of designating the coordinate in a circumferential direction in the coordinate of the pattern date, and a reference signal capable of turning-on or off laser from the laser light exposure device for each divisional unit while the original photoresist plate is rotated once, is produced. In the description thereinafter, the reference signal is referred to as the divisional unit clock signal. By using a period of divisional unit clock signals, the laser from the laser light exposure device is controlled, according to division numbers in the coordinate in a circumferential direction in the coordinate of pattern data and a numerical value of "1" or "0" indicating a concave or convex shape. The laser is turned on in a case of a concave shape and is turning off in a case of a convex shape. The control signal for turning-on or off the laser, which is provided from the pattern generate, is not limited to the digital signals of "1" and "0", but an analog signal capable of controlling laser power in proportion to the magnitude of the control signal may be used.

Figure 11:
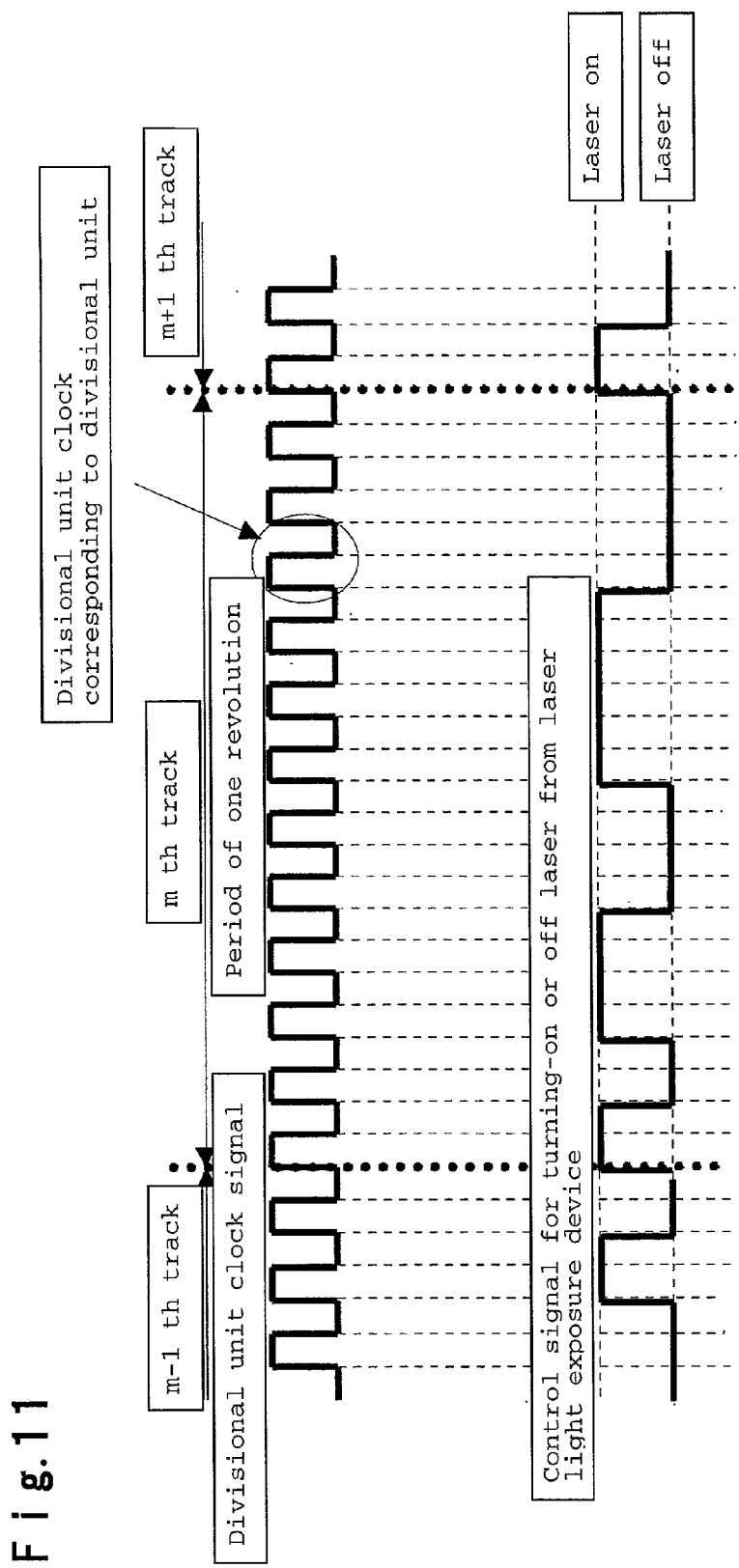
FIG. 11 is a diagram showing an example of signals for controlling ON/OFF of laser emitted from a laser light exposure device, which are provided from a pattern generator.

FIG. 11 shows an example of a control signal, outputted from the pattern generator, which turns on or off laser from the laser light exposure device.

The laser light exposure device moves a fine spot of laser light, which is focused by an objective lens, linearly at a constant speed from an outer circumferential side or an inner circumferential side of the original photoresist plate so that the fine spot is moved from a track to an adjacent track while the original photoresist plate having a circular disk-like shape on which a photoresist is coated is rotated 360°.

Thus, a pattern of concave-convex shape which is to be formed in a substrate can be transferred into the original photoresist plate having a circular disk-like shape coated with a photoresist, by moving a fine spot of laser light, which is focused by an objective lens, linearly at a constant speed from an outer circumferential side or an inner circumferential side of the original photoresist plate while the laser light is turned on or off according to divisional numbers in the coordinate of circumferential direction axis of the pattern data in a period of divisional unit clock signal for each track, and the laser light is moved from a track to an adjacent track during one revolution of the original photoresist plate. Further, the number of division in a track when the pattern date are inputted, the determination of the concave-convex pattern, the determination of a track distance in response to a change of the speed for moving the laser light from the laser light exposure device, and determinations of laser power and the diameter of laser beam can be regulated, whereby divisional units of concave-convex pattern can be dispersed in a track direction or in radial direction, or can be arranged continuously in a track direction or a radial direction. Thus, various concave-convex patterns can be formed.

The fine channel device of the present invention includes a fine channel device formed by laminating integrally a cover member or another fine channel substrate on the substrate having a fine channel which is produced as above-mentioned, for example. The substrate having a fine channel as described above and a cover member or another fine channel substrate are bonded together by means of heat bonding or with a UV-setting resin or a photo-setting resin.

Now, the present invention will be described in detail with reference to Examples. However, it should be understood that the present invention is by no means restricted by such specific Examples, and a modification and combination is possible. Further, in the present invention, the front surface and the rear surface of the fine channel substrate are so determined that when either surface of the fine channel substrate is designated as a front surface, the reverse side is designated as a rear surface, and therefore, the front surface can be either surface of the fine channel substrate.

EXAMPLE 1

Figure 12:
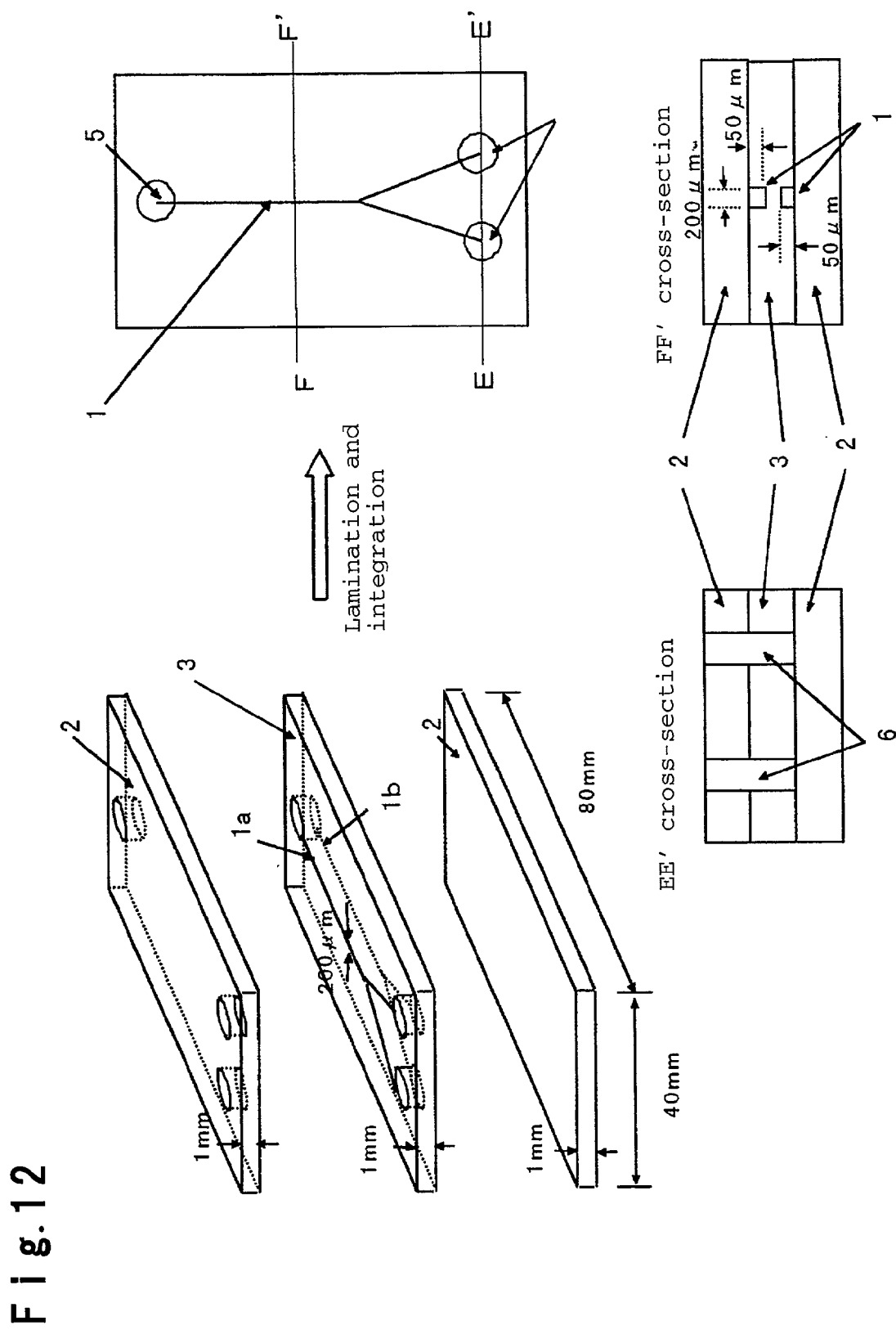
FIG. 12 is a diagram showing a fine channel device wherein a fine channel is formed in each surface of a fine channel substrate, described in Example 1.
Figure 13:
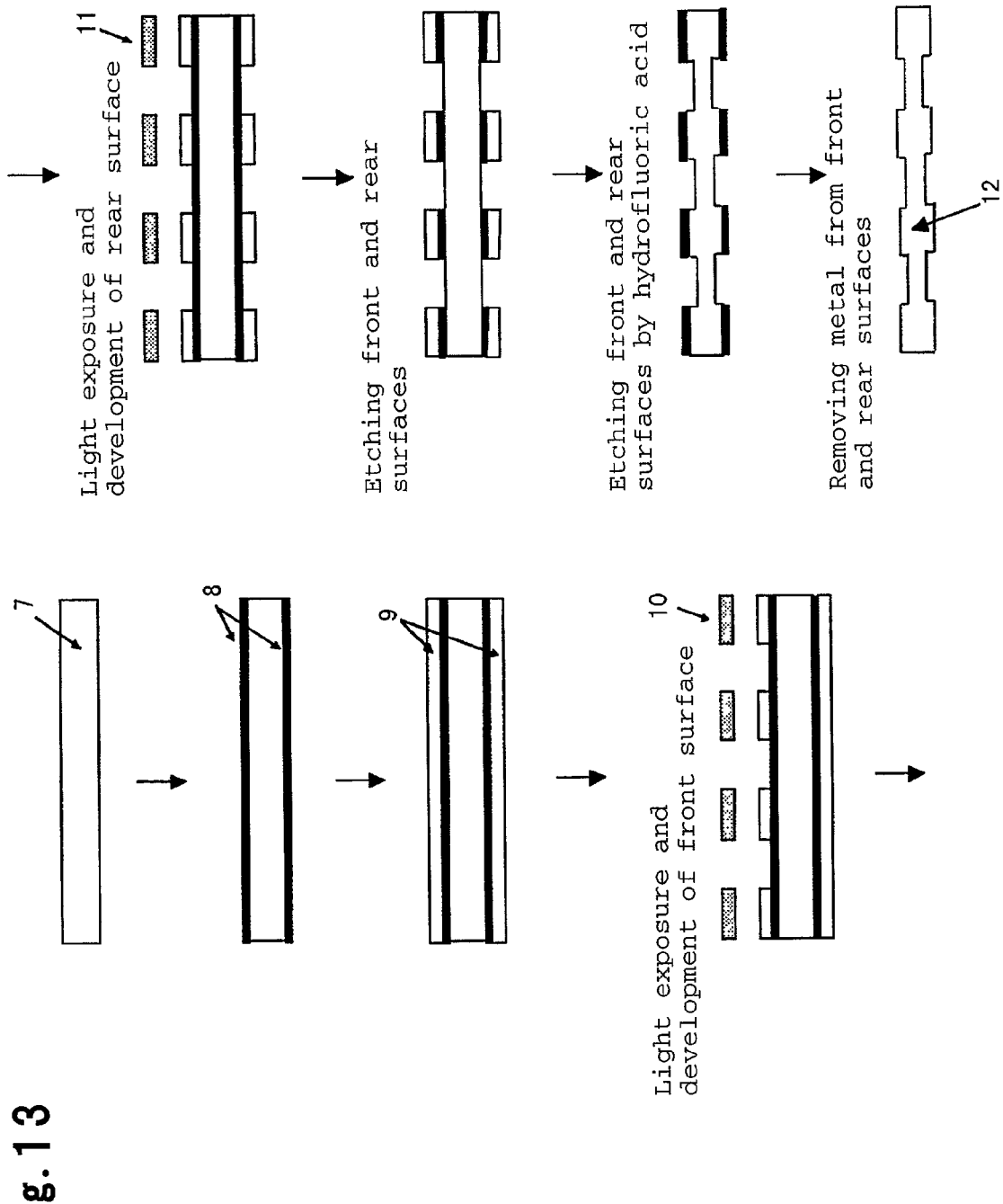
FIG. 13 is a diagram showing an example of work flow in a case that a fine channel substrate having a concave-convex pattern in its both surfaces is formed by etching a glass substrate.

FIG. 12 shows Example 1 of the present invention. Y-letter like fine channels 1a, 1b each having a width of 200 μm and a depth of 50 μm were formed on substrate surfaces. These fine channels 1a, 1b were formed according to the flow of fabrication sequence as shown in FIG. 13.

A metallic film 8 such as gold was formed on both surfaces of a glass substrate 7 of 1 mm thick, 80 mm long and 40 mm wide in such a thickness that light for exposure, which will be described later, does not transmit through the metallic layer 8, and a photoresist 9 was coated on each of the substrate surfaces. On photoresists 9, photomasks 10, 11 each having a pattern corresponding to a shape of fine channel were placed. Light exposure was conducted for each surface followed by developing. Then, the metallic films 8 on front and rear surfaces of the substrate were etched with acid, and the photomasks 9 and the glass were etched with a hydrofluoric acid from both sides of the substrate 7. Further, the metallic films remaining on the front and rear surfaces were dissolved by using acid to thereby obtain the glass substrate 7 in which fine channels 1a, 1b were formed. As fluid inlet ports 4 and a fluid outlet port 5, perforated openings 6 each having a diameter of 1 mm were formed in the glass substrate 7 with mechanical processing means.

A flat glass cover member 2 of 1 mm thick, 80 mm long and 40 mm wide in which small perforated openings of 1 mm in diameter were previously formed at positions corresponding to the fluid inlet ports 4 and the fluid outlet port 5 of the fine channels 1a, 1b with mechanical processing means, and another flat glass cover member 2 of 1 mm thick, 80 mm long and 40 mm wide having no perforated opening, were heat-bonded onto the front and rear surfaces having the fine channels 1a, 1b, whereby a fine channel device having fine channels 1 in both substrate surfaces was prepared as shown in FIG. 12.

Two kinds of chemical can be introduced through two fluid inlet ports 4 of the fine channel device to cause a predetermined chemical reaction, and a reaction product can be obtained at the fluid outlet port 5. In this case, the yield of the reaction product can be increased to about twice in comparison with a fine channel device having a fine channel only in its one substrate surface, while maintaining the characteristics of a fine space capable of conducting an efficient chemical reaction due to effects of a short diffusion distance of molecule and a large specific interfacial area of fine space.

Figure 14:
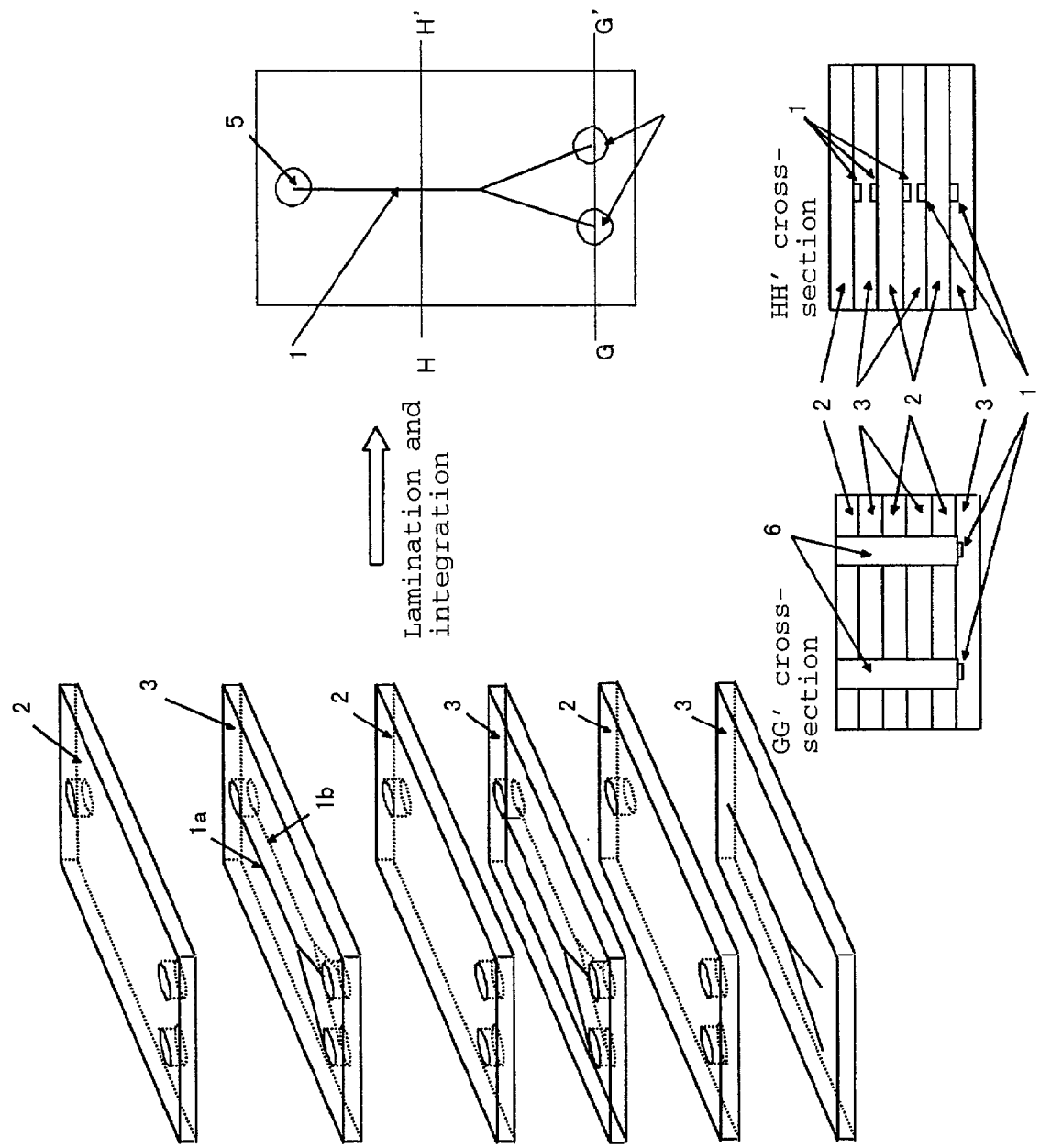
FIG. 14 is a diagram showing a fine channel device having a multi-layered structure wherein a fine channel is formed its both surfaces of each fine channel substrate, described in Example 1.

Further, a fine channel device having a multi-layered structure was prepared in the following manner. Glass cover members 2 in which perforated small openings of 1 mm in diameter were previously formed at positions corresponding to the fluid inlet ports 4 and the fluid outlet port 5 for fine channels 1a, 1b were prepared. Further, fine channel substrates 3 each having fine channels 1a, 1b in both substrate surfaces were prepared. The glass cover members 2 and the fine channel substrates 3 were laminated alternately in the order of cover member 2-fine channel substrate 3-cover member 2-fine channel substrate 3-cover member 2, and a fine channel substrate 3 having a concave-convex pattern only in its front surface was placed on the lowermost cover member 2, the lamination body was heat-bonded together. FIG. 14 shows the general outer shape of the fine channel device having a multi-layered structure. By using the fine channel device shown in FIG. 14, the yield of the reaction product obtainable from a chemical reaction can be about 5 times as much as the yield obtainable from the same multi-layered fine channel device in which the fine channel is formed only one surface of each substrate. The number of lamination in the multi-layered fine channel device is not limited to that shown in FIG. 14.

EXAMPLE 2

Figure 15:
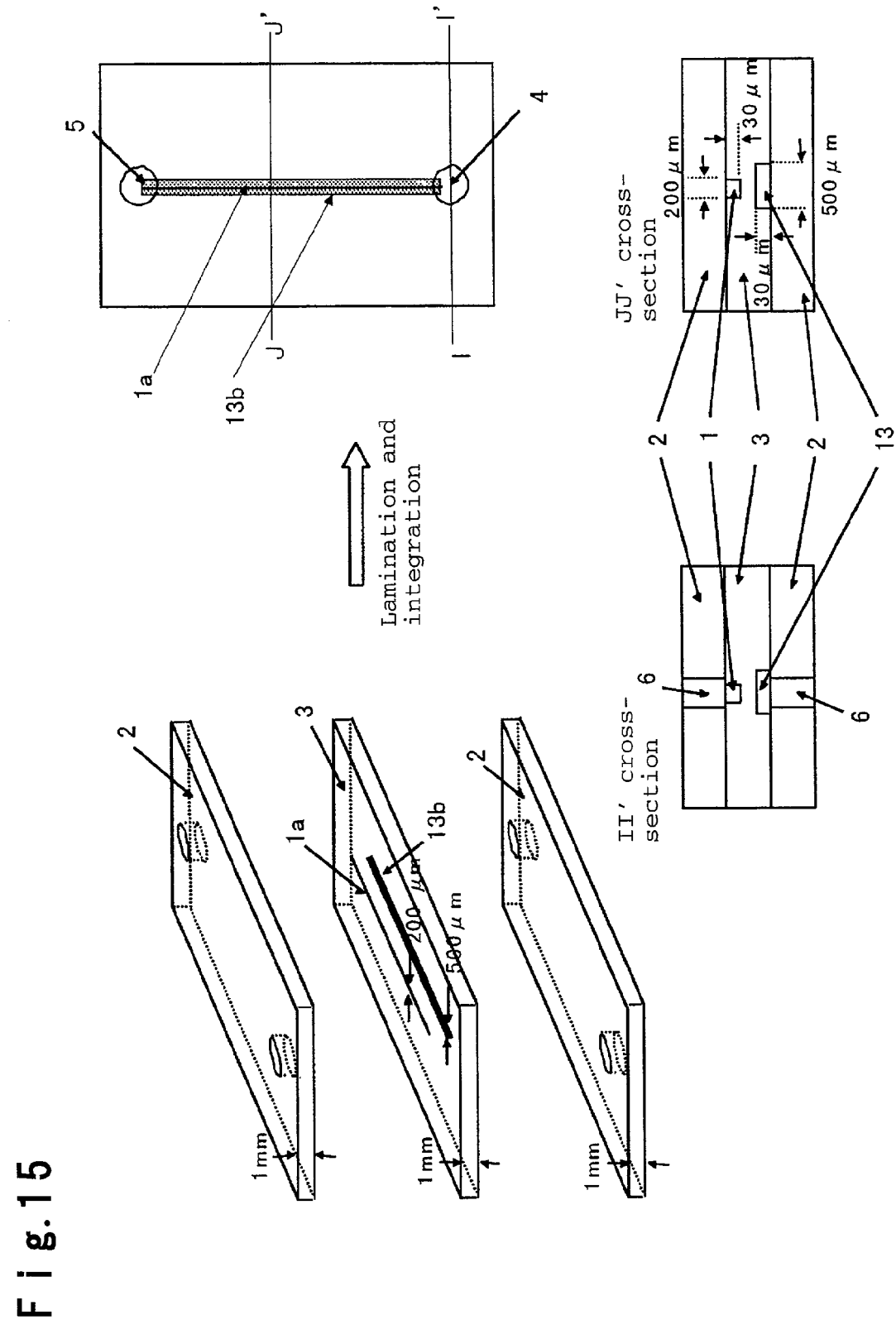
FIG. 15 is a diagram showing a fine channel device comprising a fine channel substrate having a fine channel in its both surfaces wherein the shape of concave-convex pattern of the fine channel in a front surface is different from that of the fine channel in a rear surface, described in Example 2.
Figure 16:
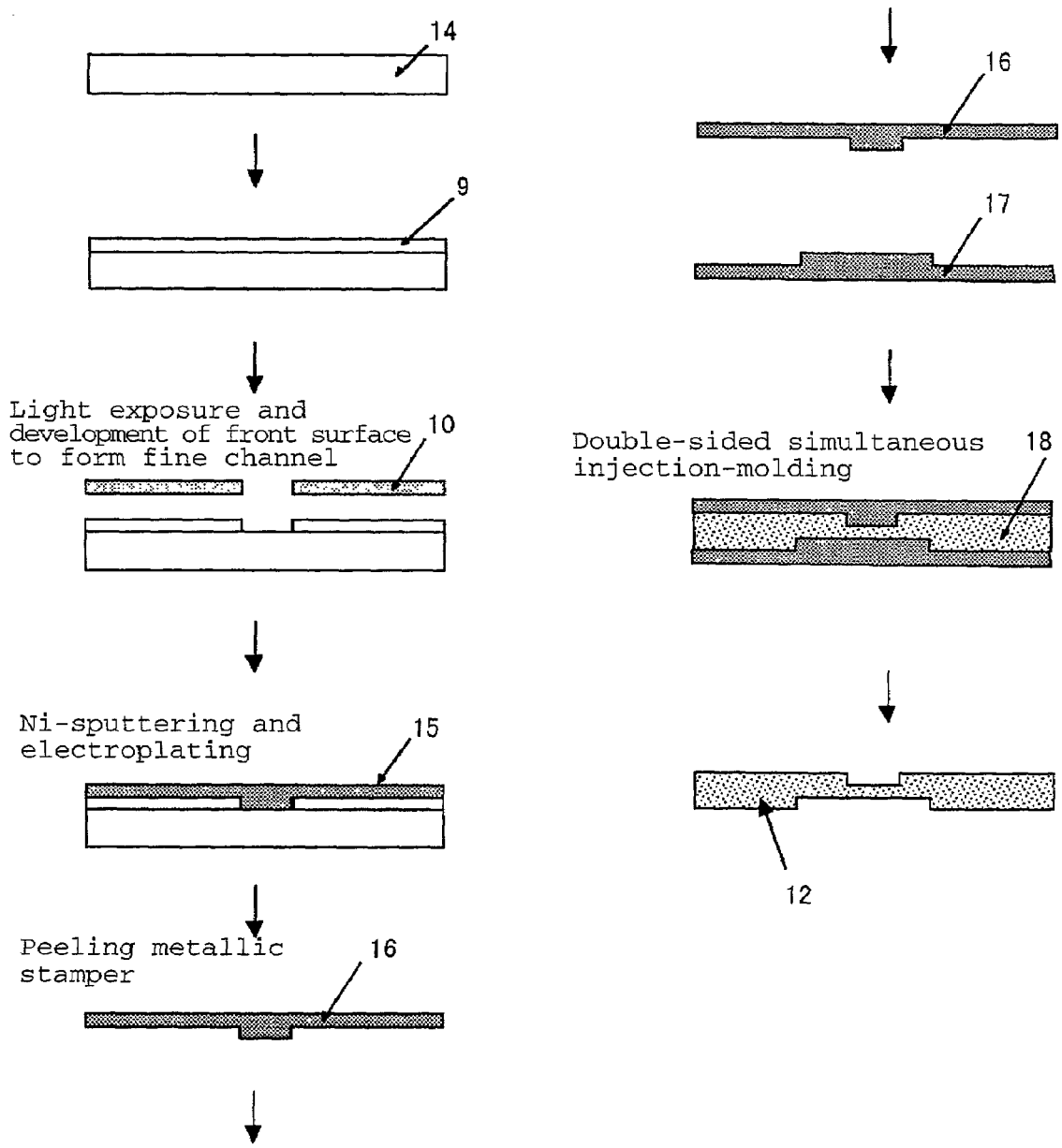
FIG. 16 is a diagram showing an example of work flow in a case that a fine channel substrate having a concave-convex pattern in its both surfaces is formed by injection-molding.

FIG. 15 shows Example 2 of the present invention. A resinous substrate 3 having a fine channel 1 was formed wherein the thickness was 1 mm, the longitudinal dimension was 80 mm and the lateral dimension was 40 mm. An I-letter like fine channel 1a of 200 µm wide and 30 µm deep was formed in a front surface of the substrate 3. In a rear surface of the substrate 3, a concave pattern 13 of 500 µm wide and 30 µm deep was formed at a position corresponding to the I-letter like fine channel 1a in the observation from a rear side of the substrate. The fine channel 1a of this example was formed according to the flow of fabrication sequence as shown in FIG. 16.

A photoresist 9 was coated on an original glass plate 14 in a thickness of 30 µm to prepare an original photoresist plate to be exposed to light. Then, a photomask 10 having an I-letter like pattern for a fine channel which is to be transferred into a front surface of the substrate 3 was placed on the original photoresist plate. Light exposure was conducted to the original photoresist plate followed by developing to thereby form a desired concave-convex pattern in the front surface of the photoresist layer 9. Then, the sputtering of metal 15 such as Ni was conducted to the front surface of the photoresist layer 9 having such concave-convex pattern, and the metal layer was electroplated into a plate-like form. The plate-like metal was peeled off whereby a metallic stamper 16 usable for a front surface of the substrate, which had the offset concave-convex pattern with respect to a desired concave-convex pattern, was prepared. Similarly, a metallic stamper 17 was prepared by using a photomask having a concave pattern which is to be formed in a rear surface of the substrate. The stamper 16 and the stamper 17 were paired. Then, resin was injected between the paired stampers 16, 17 in the same manner as above, whereby a fine channel substrate 12 having a front surface in which a fine channel 1a was formed and a rear surface in which a concave pattern 13 was formed, was prepared as shown in FIG. 15.

Cover members 2 made of resin of 100 µm thick, 80 mm long and 40 mm wide in which perforated small openings 6 of 1 mm in diameter were previously formed at positions corresponding to a fluid inlet port 4 and a fluid outlet port 5 of the fine channel 1a in the fine channel substrate 3 were heat-bonded to the front and rear surfaces of the substrate 3. Thus, a fine channel device having channels 1, 13 in both surfaces of the substrate, wherein the shape of the channels are different and independent from each other, as shown in FIG. 15, was prepared.

Liquid obtained by mixing previously two kinds of chemical which do not react in the room temperature but react at 80° C. or higher was supplied from a small opening 6 at a front surface side of the fine channel device. Further, a heating liquid heated to 80° C. or higher was supplied from a small opening 6 at a rear surface side of the fine channel device. The liquid obtained by mixing previously two kinds of chemical, which is supplied to the fine channel 1a in the front surface of the fine channel substrate is heated to 80° C. or higher by the heating liquid supplied to the concave-patterned fine channel 13 in the rear surface of the substrate 3, and the two kinds of chemical react in the fine channel 1a so that a reaction product can be obtained at the outlet port 5 of the device. Further, it is possible to control the reaction by using a switch-over valve or the like to be provided outside, which is capable of switching liquid supply so that the heating liquid supplied to the fine channel in the rear surface of the fine channel device is switched to a supply of a cooling liquid, whereby temperature control is carried out. Thus, a functional unit capable of controlling the reaction in the fine channel formed in the front surface of the fine channel device can be arranged three-dimensionally in the fine channel.

EXAMPLE 3

Figure 17:
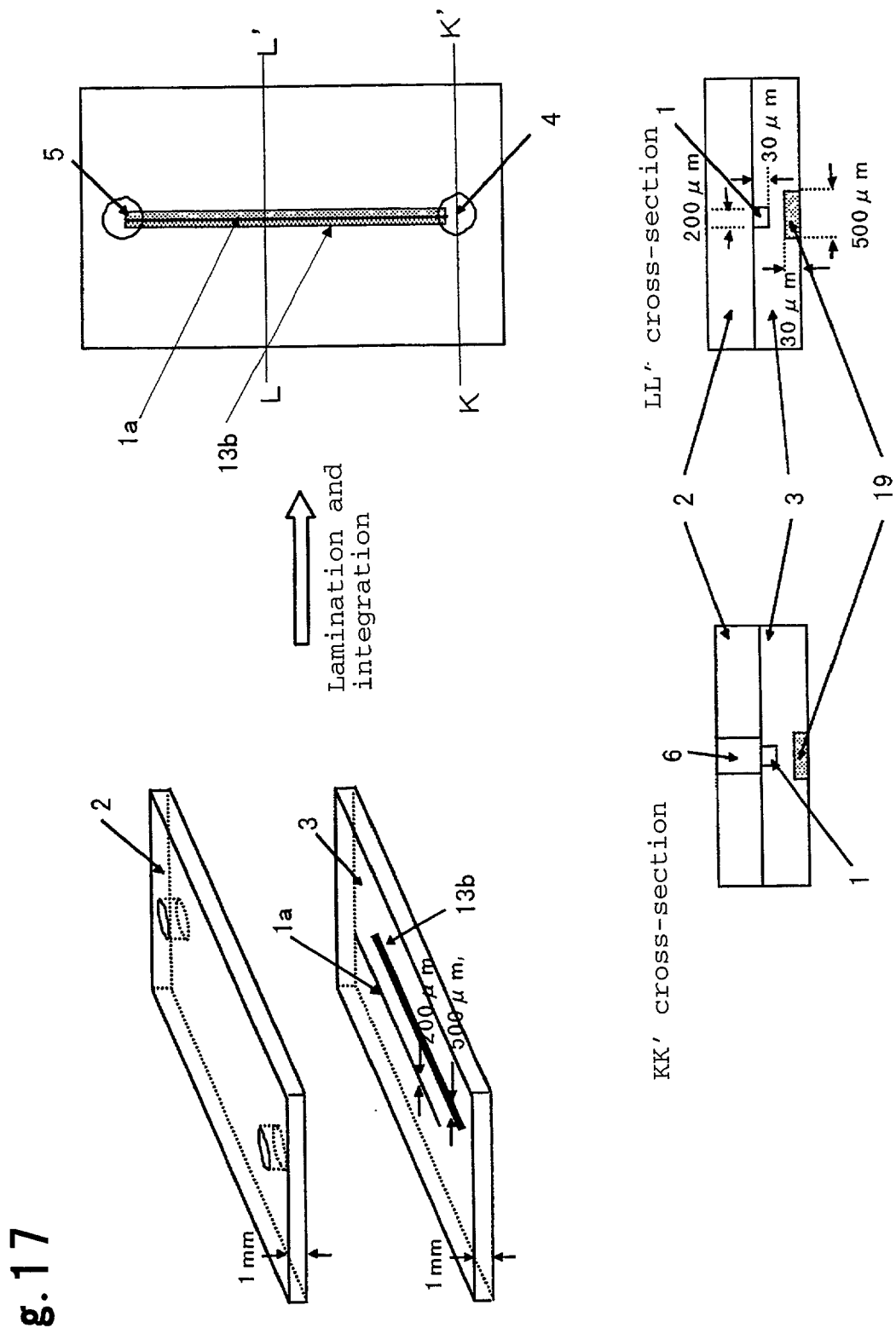
FIG. 17 is a diagram showing a fine channel device comprising a fine channel substrate wherein a fine channel is formed in its front surface and a Ni—Cr alloy is embedded in a concave-convex pattern in a rear surface to provide a heating/cooling function, described in Example 3.

FIG. 17 shows Example 3 of the present invention. A resinous substrate 3 having a fine channel 1 was formed wherein the thickness was 1 mm, the longitudinal dimension was 80 mm and the lateral dimension was 40 mm. An I-letter like fine channel 1a of 200 µm wide and 30 µm deep was formed in a front surface of the substrate 3. A concave pattern 13b of 500 µm wide and 30 µm deep was formed at a position corresponding to the I-letter like fine channel 1a in the observation from a rear side of the substrate. In the concave pattern 13b, a Ni—Cr alloy was embedded. The fine channel substrate in this Example was prepared by injection-molding in the same manner as Example 2.

Figure 18:
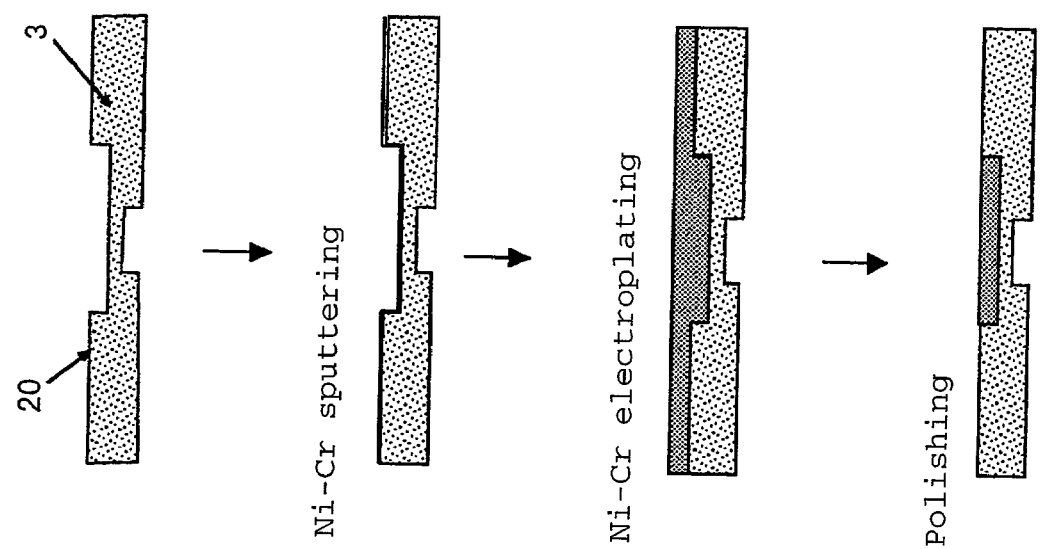
FIG. 18 is a diagram showing an example of work flow in a case of embedding metal in a concave-convex pattern of a substrate.

The embedding of the Ni—Cr alloy 19 in the concave pattern formed in the rear surface of the fine channel substrate was conducted according to the flow of fabrication sequence shown in FIG. 18. First, an electrically conductive metallic film of Ni—Cr alloy was formed on the entire rear surface including the concave portion of the fine channel substrate by sputtering, CVD method or the like. Then, electroplating was conducted by using the above-mentioned alloy to the entire rear surface of the fine channel substrate so as to fill the concave portion, whereby an electroplated layer of metal was formed. Then, the entire surface of the electroplated layer of metal was polished uniformly so that the portion of the electroplated layer corresponding to the portion other than the concave portion was removed, so that the Ni—Cr alloy was embedded only in the concave portion formed in the rear surface of the fine channel substrate. The thus formed rear surface of the fine channel substrate had a very flat surface without any step under the condition that the Ni—Cr alloy was embedded in the concave portion.

A resinous cover member 2 of 100 µm thick, 80 mm long and 40 mm wide in which small openings of 1 mm in diameter were previously formed at positions corresponding to a fluid inlet port 4 and a fluid outlet port 5 of the fine channel 1 was heat-bonded to the front surface of the fine channel substrate 3 to thereby prepare a fine channel device as shown in FIG. 17.

Liquid obtained by mixing previously two kinds of chemical which do not react at the room temperature but react at 80° C. or higher is supplied from the inlet port 4 at a front surface side of the fine channel device. Further, an electric current is supplied to the Ni—Cr alloy 19 embedded in the concave portion formed in the rear surface of the fine channel substrate so that the alloy 19 serves as a heater. The liquid formed by mixing the two kinds of chemical supplied to the fine channel 1a in the front surface of the fine channel device is heated to 80° C. or higher by the heater in the rear surface of the device. Then, the two kinds of chemical react in the fine channel 1a in the front surface of the fine channel device, and a reaction product can be obtained at the outlet port 5 in the front surface of the device. Further, it is possible to control the temperature of the heater by controlling an amount of electric current to be supplied to the Ni—Cr alloy embedded in the concave portion in the rear surface of the fine channel device whereby control of the reaction can be performed. Thus, a functional unit capable of controlling the reaction in the fine channel formed in the front surface of the fine channel device can be arranged three-dimensionally to the fire channel.

Further, as a developed modification of the present invention, a functional unit having an electrical, magnetic or physical function such as a heater, piezoelectric element, electromagnet or the like may be disposed on or embedded in the rear surface of the fine channel substrate. Further, a wiring pattern with an electric/electronic element such as resistor, capacitor, IC, LSI, CPU or the like to operate the functional unit electrically, may be formed in the concave pattern in the rear surface according to the above-mentioned method wherein the electrically conductive metal is embedded in the concave pattern formed in the rear surface of the fine channel substrate so that the rear surface of the fine channel substrate can have function as a wiring substrate. In this case, such functional unit or electric/electronic element such as resistor, capacitor, IC, LSI, CPU or the like may be mounted on the wiring substrate formed in the rear surface of the fine channel substrate. Since the rear surface of the fine channel substrate formed according to this Example had a very flat surface without a step under the condition that the metal is embedded in the concave portion, another wiring substrate or fine channel substrate may be overlaid integrally on this surface.

EXAMPLE 4

Figure 19:
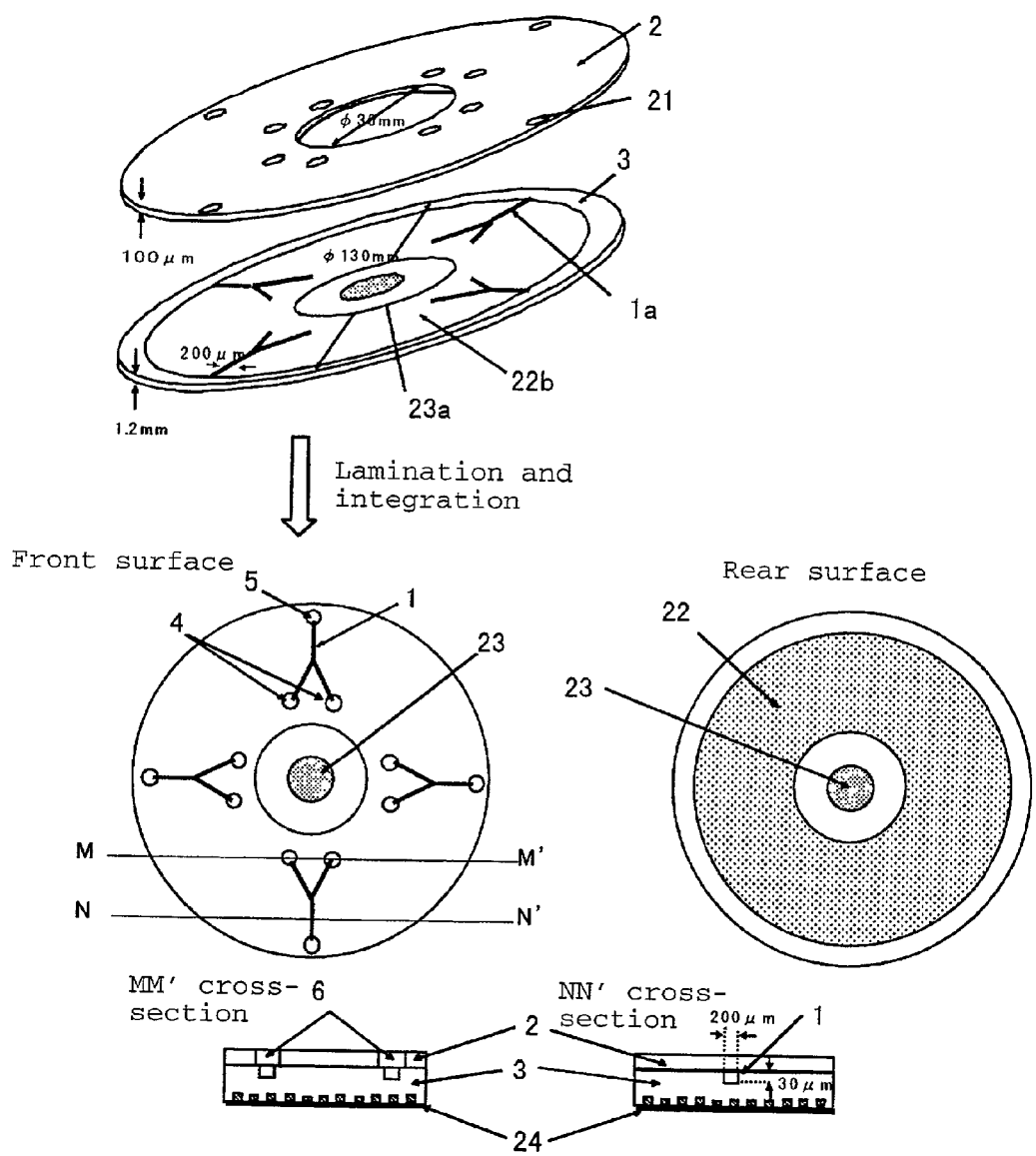
FIG. 19 is a diagram showing a fine channel device comprising a fine channel substrate wherein a fine channel is formed in its front surface and an optical recording medium is formed in its rear surface, described in Example 4.
Figure 20:
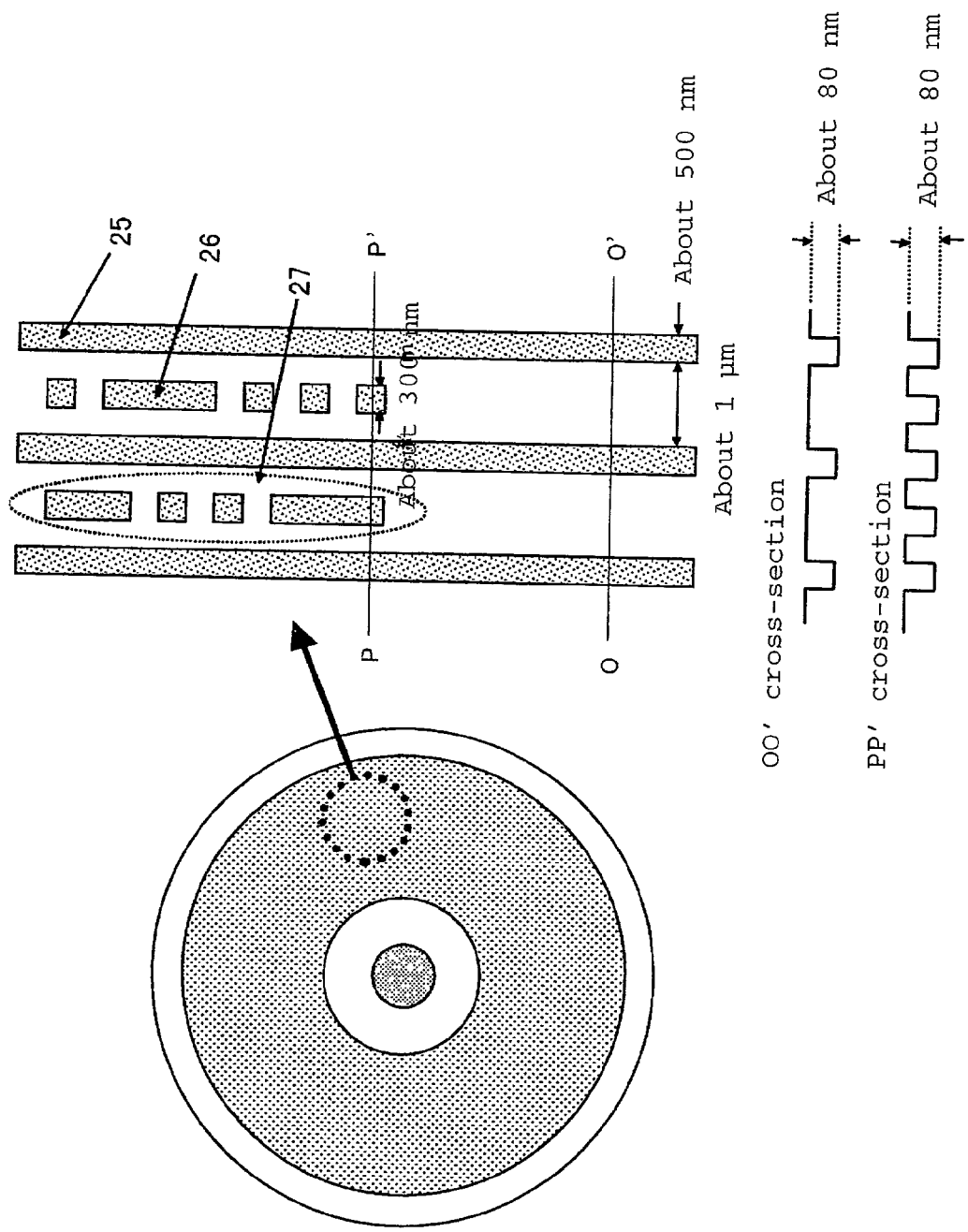
FIG. 20 is a diagram showing an example of a typical concave-convex pattern in an optical recording medium.

FIG. 19 shows Example 4 of the present invention. A fine channel device made of resin having a circular disk-like shape was prepared wherein the thickness was 1.2 mm and the diameter was 130 mm. The shape of a fine channel was Y-letter like shape having a width of 200 μm and a depth of 30 μm, and 4 fine channels 1 were formed radially in a front surface of a fine channel substrate 3. Further, a concave-convex pattern, which is similar to that formed in a so-called optical recording medium capable of recording or detecting information by using laser or the like, was formed in a rear surface of the fine channel substrate 3. The fine channels 1 in the front surface and the concave-convex pattern in the rear surface of the fine channel substrate 3 in this Embodiment were formed according to the method described in Example 6 which will be described thereinafter. A concave-convex pattern to be formed in the substrate of an optical recording medium such as a magneto-optical disk is so constructed that a spiral groove 25 of about 500 nm wide and about 80 nm deep is formed with a pitch of about 0.8 to 1 μm from the outer periphery toward the inner periphery of the circular disk, and recesses 26 of about 500 nm wide, about 80 nm deep and about 500 nm to 2 μm long, which hold an address information 27 or the like are formed at several locations with predetermined intervals for each circuit of the spiral groove 25. FIG. 20 shows an example of the concave-convex pattern of an optical recording medium formed in the rear surface of the fine channel substrate 3.

In FIG. 19, a hub 23 having a diameter of 15 mm for supporting the fine channel device in order to rotate it was attached to the center of the circular disk-like fine channel device. In this Example, the hub 23 was embedded in the substrate 3 when the substrate having the fine channels 1 in its front surface and the concave-convex pattern for optical recording medium in its rear surface was formed by double-sided injection-molding.

A doughnut-like cover member of resin 2 having a thickness of 100 μm, an outer diameter of 130 mm, and a center opening of 30 mm in which small openings 21 of 1 mm in diameter were previously formed at positions corresponding to fluid inlet ports 4 and fluid outlet port 5 of the 4 fine channels was heat-bonded to the front surface of the fine channel substrate 3. An information recording layer 24 usable for the optical recording medium was formed on the rear surface of the fine channel substrate 3. The information recording layer 24 comprises a recording layer, a protective layer and a reflective layer on the rear surface of the substrate in this order. The recording layer 24 comprises a recording film capable of recording information by a change of the crystal structure of a substance, a change of a molecular structure and so on by utilizing heat such as laser for recording or detection, and capable of detecting the recorded information by a change of light quantity of a reflective laser light, refractive index, polarization plane or the like.

More detailed explanation will be made as to an information recording/reading system to the fine channel device of the present invention with reference to FIG. 21.

Figure 21:
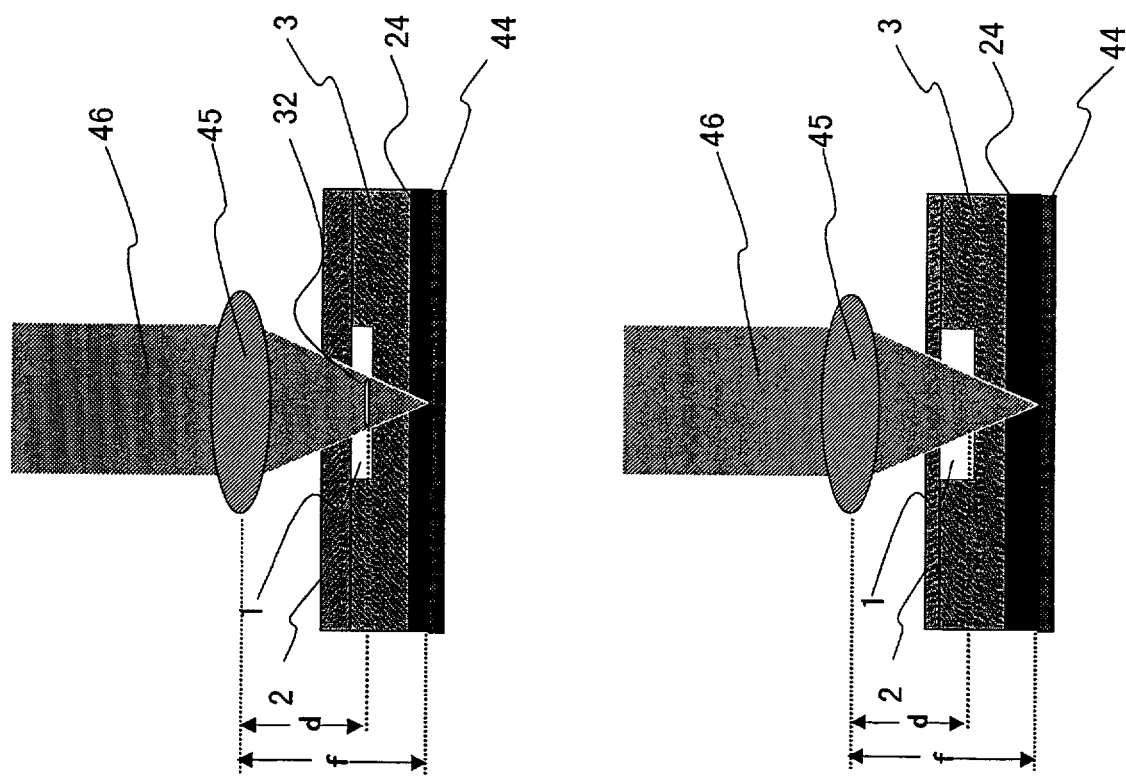
FIG. 21 is a diagram showing in cross section the fine channel device in Example 4, for explaining the method for detecting an analyzed substance and an information recording/reading system by using the fine channel device having optical recording medium according to the present invention.

FIG. 21(*a*) is a cross-sectional view of the fine channel device in Example 4. A fluorescence-labeled substance 32 as an object of analysis is located on the fine channel substrate 3 of Example 4, and the information recording layer 24 is formed on the rear surface of the fine channel substrate 3. In this Embodiment, the fine channel substrate 3 made of resin is used. However, the fine channel substrate 3 may be of glass or resin which is optically transparent to the wavelength of laser for inspection and can withstand to a sample solution or the like. Further, the information recording layer 24 comprises a recording layer composed of a recording film which causes a change of light quantity of a reflective laser light for inspection, refractive index, polarization plane or the like due to a change of the shape, crystallization, molecule structure or the like of the information recording layer. Further, the information recording layer 24 comprises a protective layer and a reflective layer 44 below the protective layer in addition to the recording layer. In this Example, a cover member is not provided on the rear surface of the fine channel substrate 3. However, the cover member may be provided for the purpose of protecting the information recording layer 24 if the case requires. Such cover member may be composed of the same material, i.e., glass or resin, as the fine channel substrate. In a case that information is recorded or read by irradiating laser from a rear side of the substrate, the material used should be transparent to the wavelength of the irradiated laser. However, in case that the cover member is only for protecting the information recording layer, transparency to the wavelength of irradiated laser is not required. It is ideal that the distance between a lens 45 and the information recording layer 24 is a distance f in consideration of the focal distance of the lens 45 and the refractive index of the fine channel substrate. Such distance can be kept always constant by utilizing a focus-servo system for astigmatism or the like. The sensitivity of recording information can be uniform because the recording or reading of information can be conducted by a laser beam spot having a constant dimension. Further, as shown in FIG. 21(a), when the converging angle of the lens 45 and the distance d between the lens and the fluorescence-labeled substance 32 as an object of analysis are adjusted so that the diameter of the fluorescence-labeled substance 32 is equal to the dimension of laser 46 passing through the fluorescence-labeled substance, the detection sensitivity can further be improved. It is preferable to select a fluorescent material for the fluorescence-labeled substance so that it can emit fluorescence at a wavelength which is different from the wavelength of the laser. In this case, the fluorescence of the fluorescence-labeled analyzed substance can be detected by using the same optical system and a filter for transmitting selectively the wavelength of fluorescence. Namely, in a case that the laser 46 is irradiated to the position of the fluorescence-labeled substance 32 as an object of analysis, the fluorescence of the fluorescence-labeled substance can be detected as shown in FIG. 21(a). On the other hand, in a case that there is no fluorescence-labeled substance 32 at the location where the laser is irradiated, the recording or reading of information is possible. Thus, both the fluorescence analysis and the recording or reading of information can be performed by using the same optical system. Further, since the above-mentioned structure is equal to the structure of the optical disk, a good S/N characteristic of the recorded/read information is obtainable even in a case that a small quantity of foreign matter adheres on the substrate surface during the handling of the fine channel device. Further, the presence of the reflective layer 44 improves the detection sensitivity because the laser 46 is irradiated to the fluorescence-labeled substance 32 in double paths. Further, the power of the laser may be changed for the purposes of detecting the fluorescence, reading the recorded information and erasing of the recorded information. Further, the fluorescence from the fluorescence-labeled substance may cause deterioration in the information-recording sensitivity. In such case, it is desirable to separate the region of the fine channels where the fluorescence-labeled substance is located from the information-recording region as shown in FIG. 5(b) to FIG. 5(e), whereby it is possible to obtain a further correct information detection.

Further, since the information recording layer 24 can record therein information before or after using the fine channel device, the first information for identifying previously the fine channel device, such as a device configuration information, a manufacture information, a shipment information and so on, and the second information such as usable conditions, kinds of usable fluid, synthesizing conditions, analyzing conditions, results of synthesis, result of analysis and so on when chemical/physical manipulations such as feeding, mixing, reacting, synthesizing, analyzing, separating, extracting, detecting of fluid are carried out, can be recorded in the fine channel device in one-on-one correspondence. Further. The method for recording information in the optical recording medium is suitable for a long term preservation since there is obtainable a stable state of recording in comparison with the method for detecting fluorescence in which a fluorescent material is used as an index.

Further, in this Example, an analyzing light for analyzing a specified substance located in a fine channel or an information-recording/reading light for recording or reading information may be a near field light obtainable by using a solid immersion lens head. In this case, it is necessary to bring an optical head, which performs the detection or recording/reading of information during moving in a floating state, closer to a distance of 100 nm or less from the front or rear surface of the fine channel device. Accordingly, in order to obtain a stable flying characteristic so as not to cause the collision of the optical head against the substrate surface when it is moved in a floating state, it is preferable that at least one surface of the fine channel substrate having a fine channel is curved to have the center of a radius of curvature at a side of the fine channel substrate wherein the radius of curvature is from 5 m to 100 m and the surface roughness (Ra) of the curved surface is 0.5 nm or less. If the radius of curvature and the surface roughness (Ra) of the substrate exceed the above-mentioned value range, it is difficult to obtain a stable flying characteristic so as not to cause the collision of the optical head against the substrate surface having a fine channel when the optical head is moved in a floating state under the condition that it is brought to a distance of 100 nm or less from the substrate surface.

In this Example, the rear surface of the fine channel device has the function of optical recording medium. However, the present invention is not limited to this Example, but the rear surface may have the function of information recording medium other than the optical recording medium for recording or detecting optically.

EXAMPLE 5

Figure 22:
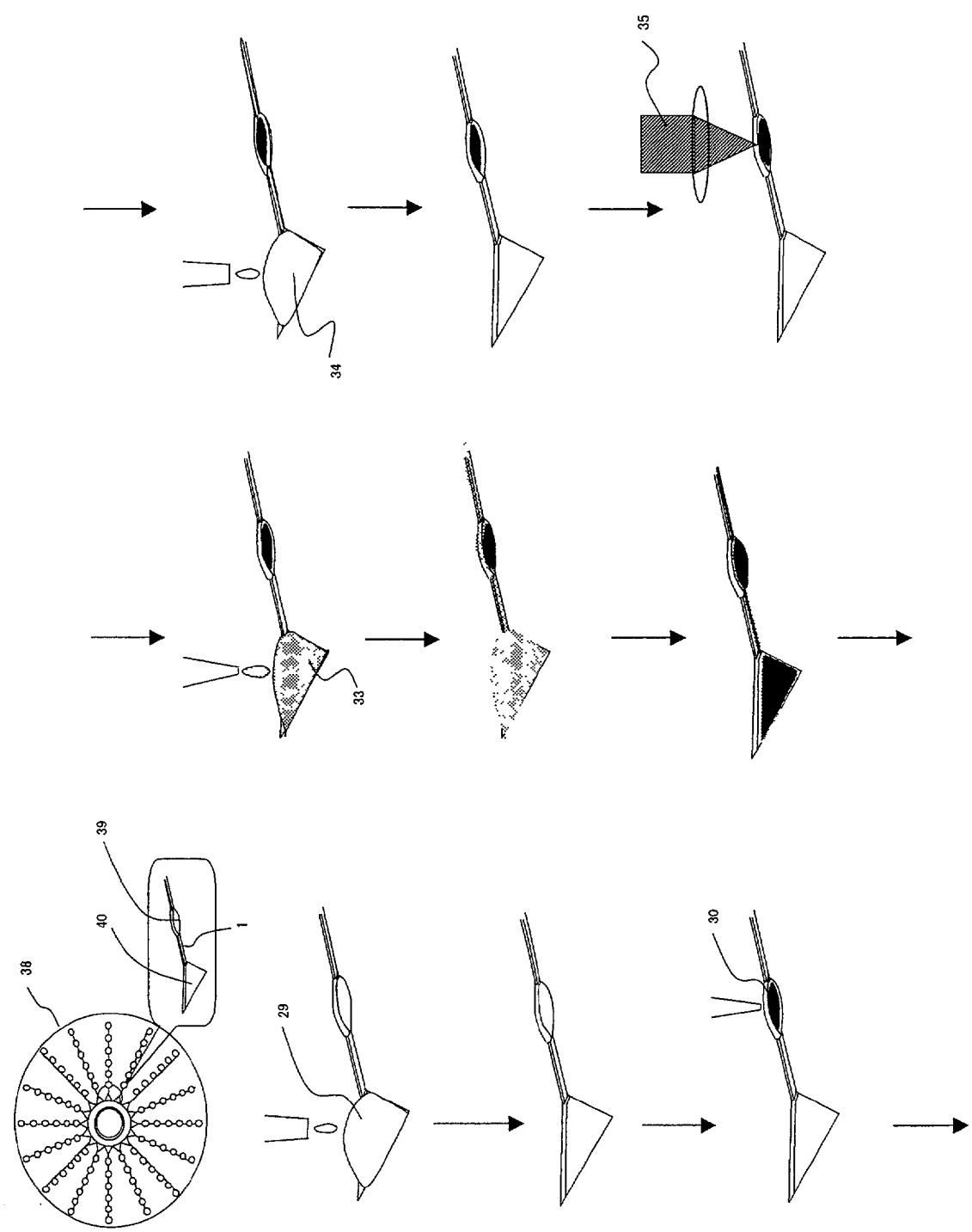
FIG. 22 is a flow chart showing a sequence of bonding an analyzed substance and a recognizable molecule for detection, described in Example 5.

FIG. 22 shows Example 5 of the present invention. As shown in FIG. 22(a), a binder 29 for a recognizable molecule is injected to a recognizable molecule fixing portion 39 in an analyzing chip 38 having a circular disk-like shape of the present invention. The binder flows outside through the fine channel 1 and the recognizable molecule fixing portion 39 due to a capillary phenomenon or a centrifugal force caused by rotating the disk. Thus, the entire portion of a fluid inlet port 40, the recognizable molecule fixing portion 39 and the fine channel 1 can be coated with the binder 29. The analyzing chip may have a cover member so that the binder 29 flows without overflowing through the fluid inlet port 40, the recognizable molecule fixing portion 39 and the fine channel 1. In this Embodiment, the fluid inlet port, the recognizable molecule fixing portion and the fine channel are constituted respectively by rectangular grooves. However, they may be constituted by, for example, grooves of hemispherical shape in cross section, and the shape of them is not in particular limited.

Explanation will be made how the analyzing chip prepared as mentioned above is used. A liquid reagent for analysis 33 is injected into an inlet port 40, and the liquid reagent 33 is fed along the channel 1 according to the above-mentioned technique as shown in FIGS. 22(e) to 22(g). In a case of using a centrifugal force by rotating the disk, the fine channel 1 is preferably curved toward an outer periphery in a direction of delay with respect to the direction of rotation whereby it is little possibility that the liquid reagent overflows the channel. When the liquid reagent contains an analyzed substance which has a selectively bonding ability to the recognizable molecule 30, they bond together at the recognizable molecule fixing portion 39. Then, a washing liquid 34 is supplied to the channel 1 to wash away the liquid reagent 33 adhered on the channel and the analyzed substance in the liquid reagent as shown in FIG. 22(h) and FIG. 22(i). Thus, it is possible to bond selectively the analyzed substance in the analyzing liquid reagent 33.

In order to detect a specified substance which has been separated, there are considered several methods. Here, description will be made as to a method that before the analyzing liquid reagent is supplied to a channel of the analyzing chip, an analyzed substance which can bond selectively to the recognizable molecule is previously fluorescence-labeled with a fluorescent material. In this case, the fluorescence-labeled analyzed substance is also fixed to the recognizable molecule fixing portion in the manipulations of FIGS. 22(e) to 22(g). Accordingly, an excitation light 35 should be irradiated to the recognizable molecule fixing portion 39 to detect the fluorescence as shown in FIG. 22(j).

Incidentally, there can be considered that after the manipulations of FIG. 22(h) and FIG. 22(i), a solution including a fluorescent material which can bond selectively to an analyzed substance is used to repeat once the manipulations of FIGS. 22(e) to 22(g), so that the fluorescent material is bonded to the analyzed substance connected selectively in the recognizable molecule fixing portion 39. Thereafter, washing is conducted according to the manipulations of FIG. 22(h) and FIG. 22(i), and the fluorescence is detected by the manipulation as in FIG. 22(j). Further, there can be considered a technique that a fluorescent material having the nature of increasing the intensity of fluorescence when an analyzed substance is bonded to the recognizable molecule, is used, the fluorescent material being bonded to the recognizable molecule fixed to the recognizable molecule fixing portion 39. Then, the intensity of fluorescence is increased when the analyzed substance is bonded to the recognizable molecule in the manipulations of FIG. 22(h) and FIG. 22(i) whereby the analyzed substance bonded can be detected.

As described above, description has been made as to the method for utilizing a fluorescence signal as the method for detecting an analyzed substance bonded to the recognizable molecule. However, there can be considered a method for detecting luminescence resulted from a chemical reaction such as a chemical luminescence or a biological luminescence; a method for detecting an electric signal from a micro-electrode, or a method for utilizing a surface plasmon resonance. Thus, there are many methods for detecting an analyzed substance bonded. Accordingly, these methods can be selected depending on objects and ways of use.

Thus, according to the present invention, since the diffusion of the recognizable molecule can be prevented by forming a predetermined fine channel in the analyzing chip, the sensitivity of fluorescence measurement can be improved. Further, the amount of liquid such as the recognizable molecule, the binder or the analyzing liquid reagent can remarkably be saved by forming the predetermined channel. Further, since a plurality of fluid inlet ports are formed in a single analyzing chip, it is possible to achieve the bonding with a plurality of analyzing liquid reagents and to perform a large number of analysis simultaneously. Further, the groove geometry such as the width or depth of the channel can be changed in the distance from its one end to the other end, or a plurality kinds of fine channels can be formed in a single analyzing chip so that a plurality of analyzing liquid reagents having different viscosity, surface tension, affinity with an analyzing chip supporter or the like can be used, whereby more kinds of analyzing liquid reagent can be used as experimental solutions. When there is a difficulty of feeding an analyzing liquid reagent by utilizing a capillary phenomenon due to a high surface tension, the shape of the fine channel should be formed into a sectorial shape as shown in FIG. 6(b) and FIG. 6(d) so that the analyzing liquid reagent flows easily.

Even in the case as shown in FIG. 6(c) and FIG. 6(d) wherein a single analyzing liquid reagent is used, other than the case a plurality of analyzing liquid reagents are used as described above, such advantages that the sensitivity of fluorescence measurement can be improved and the amount of analyzing liquid reagent can be reduced, can be assured.

Further, as shown in FIGS. 23(a) to 23(d), when a concave-convex pattern is formed in the bottom of the recognizable molecule fixed portion 39, the surface roughness or the surface area of the inner wall of the fine channel can be increased whereby an undesirable separation of the recognizable molecule can be prevented. Further, since many recognizable molecule can be fixed to the recognizable molecule fixing portion 39 having an increased surface area, the sensitivity of fluorescence measurement can be improved.

EXAMPLE 6

FIG. 24 is a diagram showing concave-convex patterns obtained by carrying out the method for producing a fine channel substrate of the present invention, as Example 6. FIGS. 24(a) to 24(c) show some examples of concave-convex pattern of substrate. A fine channel is formed in such a manner that each concave-convex pattern is formed by molding resin with use of a stamper prepared by a laser light exposure device for exposing light to an original photoresist plate coated with a photoresist while the original photoresist plate is rotated. As the laser light source of the laser light exposure device used in this Example, an Argon laser having a wavelength of 458 nm was used. The number of revolution of the photoresist plate to be subjected to light exposure was 450 rpm; the number of division per each track was 1,000,000, and the frequency of a divisional unit clock signal produced by the pattern generator, which was obtainable from the number of revolution of the original photoresist plate and the number of division per each track, was 7.5 MHz. Further, each track was divided into 1,000,000 portions. Actually, the track having divided 1,000,000 portions was divided into 200 groups each having 5,000 portions; the data of the concave-convex pattern of one group was produced in the personal computer. Then, a substrate in which a fine channel of a concave-convex pattern formed by repeating the produced pattern 200 times per one track, was prepared. In this Example, a positive type resist was used. Accordingly, a portion exposed to laser constitutes a concave pattern and a portion without exposure to laser constitutes a convex pattern. However, the present invention is not limited to the above-mentioned example. When a negative type resist is used, a portion exposed to laser constitutes a convex pattern, and a portion without exposure to laser constitutes a concave pattern.

FIG. 24(a) shows a substrate in which a fine channel having a concave-convex pattern which is formed by dispersing divisional units in a track direction to broaden the distance between tracks, and adjusting the laser power and the laser beam diameter to disperse the concave pattern in a radial direction. In this case, the laser light was moved linearly at a speed of 12 μm/sec from an outer periphery side to an inner periphery side of the original photoresist plate so that the distance between tracks was about 1.6 μm. Further, the laser power and the laser beam diameter were adjusted so that the width in a radial direction of the concave pattern exposed to laser was about 0.45 µm.

FIG. 24(b) shows a substrate in which a fine channel having a concave-convex pattern is formed, which was formed in the same manner as in FIG. 24(a) with respect to the distance between tracks, the laser power and the laser beam diameter except that a concave pattern was formed by connecting continuously two divisional units in a track direction.

FIG. 24(c) shows a substrate in which a fine channel having a concave-convex pattern wherein concave patterns are connected continuously in a radial direction is formed, which was prepared in the same manner as in the case of FIG. 24(b) except that the laser light was moved linearly at a speed of 6.375 µm/sec from an outer periphery side to an inner periphery side of the original photoresist plate so that the distance between tracks was 0.85 µm, and the laser power and the laser beam diameter were adjusted so that the width in a radial direction of the concave pattern exposed was about 1.0 µm.

The concave-convex pattern of the fine channel formed in the substrate according to the present invention is not limited to the embodiments as shown in FIGS. 24(a) to 24(c). By determining suitably the number of division per track and the structure of concave-convex when the data of pattern are inputted, changing the moving speed of the laser light from the laser light exposure device to determine the distance between tracks and determining the laser power and the laser beam diameter, divisional units of concave-convex pattern can be dispersed in a track direction or a radial direction, or connecting continuously divisional units of concave-convex pattern in a track direction or a radial direction, whereby a fine channel having various concave-convex pattern can be formed in the substrate.

FIG. 25 is a diagram showing an embodiment of the fine channel device prepared according to the present invention. As the substrate in which a fine channel having a concave-convex pattern is formed, which constitutes the fine channel device, a doughnut-like polycarbonate substrate having a diameter of 130 mm, a thickness of 1.2 mm and a center opening of 10 mm in diameter was used. In this substrate, 4 I-letter like fine channels of 30 mm long and 10 µm deep wherein the width of a channel at a position of 15 mm from an outer periphery side was 100 µm and the width of the channel at a position of 15 mm from an inner periphery side was 200 µm, were formed radially from the center of the circular disk-like substrate. As a cover member, a doughnut-like polycarbonate sheet having a thickness of 100 µm, an outer diameter of 130 mm and a center opening of 10 mm in diameter was used. In the cover member, small openings of 1 mm in diameter were previously formed at positions corresponding to inlet ports and outlet ports of respective fine channels. The cover member was laminated on the substrate in which the fine channels of concave-convex pattern were formed, and were integrated by heat-bonding.

According to the present invention since same or different concave-convex patterns are formed in front and rear surfaces of a fine channel substrate, a fine channel device provided with a functional unit having an electrical, mechanical, magnetic, physical, chemical function three-dimensionally on the substrate can be provided. By such arrangement, the fine channel device can have, for example, a heating function, a cooling function or the like and can serve as an electric/electronic circuit substrate on which an electric/electronic element for controlling such function is mounted. Further, on either or both surfaces of the substrate having a fine channel, another substrate in which a channel or channels of same or different concave-convex pattern may be laminated to form a multi-layered fine channel device effectively. With this, the yield of a reaction product synthesized chemically in the fine channel device can be increased.

Further according to the present invention, a fine channel device capable of recording/reading a manufacture information of the fine channel device itself or a synthesis information, an analysis information, a personal information or the like obtained when a synthesizing or analyzing operation is carried out by the fine channel device, and having function as an optical recording medium for preserving a recorded information for a long term, can be obtained.

Further according to the present invention, a fine channel device for analyzing a specified substance, which is generally referred to as an analyzing chip, which allows use of a plurality of different analyzing liquid reagents, and which is capable of conducting different kinds of analysis simultaneously can be obtained. Further, the analyzing chip which can reduce the amount of sample used and can improve the sensitivity of fluorescence measurement can be obtained.

Further, in the method for producing a fine channel device according to the present invention, a substrate having a fine channel can be produced as an injection-molded product of resin by using a stamper for transferring a concave-convex pattern of fine channel, whereby the molding time per one substrate can be shortened to several ten seconds. Thus, the production time can substantially shortened in comparison with a conventional method requiring several ten minutes to several hours for manufacturing each substrate wherein substrates are developed one by one with a photomask followed by etching, so that a channel or channels are formed. Accordingly, substrates having a fine channel can be produced in a short time and large scale. Further, when the stamper for transferring a concave-convex pattern is produced, the concave-convex pattern can be formed by converting a concave-convex pattern information into electric signals in a pattern generator; supplying a control information comprising the electric signals to a laser light exposure device, and turning-on/off laser light from the laser light exposure device in response to the electric signals. Accordingly, any photomask for forming a concave-convex pattern is not required. The formation of a fine channel having various kinds of concave-convex pattern or a change of the pattern even if it is slight, can be conducted easily. Thus, the fabrication of the photomask is unnecessary, and the time and cost for producing the photomask can be saved. Accordingly, it is possible to produce the fine channel device more economically and in a large scale.

The entire disclosures of Japanese Patent Application No. 2001-116984 filed on Apr. 16, 2001, Japanese Patent Application No. 2001-116985 filed on Apr. 16, 2001, Japanese Patent Application No. 2001-240872 filed on Aug. 8, 2001 and Japanese Patent Application No. 2001-245949 filed on Aug. 14, 2001 including specifications, claims, drawings and summaries are incorporated herein by reference in their entireties.

What is claimed is:

1. A device comprising:
a first single substrate having a first channel formed on a front surface of the first single substrate, the first channel extending between two openings, and a second channel formed on a rear surface of the first single substrate, the second channel extending between the two openings, each opening extending from the front surface to the rear surface of the first single substrate; and an information recording layer forming an optical recording medium on at least one of the front and rear surfaces of the first single substrate.

2. The device according to claim 1, wherein the first channel is formed by overlaying a second substrate on the first surface of the first single substrate.

3. The device according to claim 2, further comprising:
at least one inlet port formed in the second substrate and connected to one of the two openings of the first channel and configured to introduce fluid to the first channel; and
at least one outlet port formed in the second substrate and connected to another one of the two openings of the first channel and configured to discharge the fluid from the first channel.

4. The device according to claim 1, wherein a second substrate having perforated openings is overlaid on each side of the first single substrate.

5. The device according to claim 1, wherein the device is formed by overlaying second substrates having perforated openings on two or more first single substrates and wherein the second substrates having perforated openings are placed at both sides of the overlaid first single substrates and between the first single substrates.

6. The device according to claim 1, wherein a second substrate having perforated openings is overlaid on one side of the first single substrate and a third substrate having no perforated opening is overlaid on the other side of the first single substrate.

7. The device according to claim 6, wherein the device is formed by overlaying second substrates having perforated openings on two or more first single substrates and wherein the second substrates having perforated openings are placed on one side of the overlaid first single substrates and between the first single substrates and a third substrate having no perforated opening is overlaid on the other side of the overlaid first single substrates.

8. The device according to claim 2, wherein an inlet port and an outlet port are provided at one side of the first single substrate, and a predetermined material is disposed on the other side of the first single substrate.

9. The device according to claim 8, wherein the predetermined material is at least one of ceramics, metal or an alloy.

10. The device according to claim 9, wherein the metal or the alloy is embedded in a side surface of the first single substrate.

11. The device according to claim 1, wherein the device is configured to synthesize a specified substance, and is provided with the optical recording medium capable of recording or reading synthesis information of the substance in the device.

12. The device according to claim 11, wherein the recording substrate on which an information recording layer for constituting the optical recording medium is formed is laminated on the first single substrate having the channel.

13. The device according to claim 11, wherein the synthesis information is one member selected from the group consisting of synthetic material information, synthesizing condition information, synthesized material information, manufacturer information and user information, or a combination of two or more members.

14. A device comprising:
a first single substrate having a first channel formed on a front surface of the first single substrate, the first channel extending between two openings, and a second channel formed on a rear surface of the first single substrate, the second channel extending between the two openings. each opening extending from the front surface to the rear surface of the first single substrate; and
an information recording layer forming an optical recording medium on at least one of the front and rear surfaces of the first single substrate,
wherein the device has at least one inlet port connected to one of the two openings of the first channel and configured to introduce fluid to the first channel, at least one outlet port connected to another one of the two openings of the first channel and configured to discharge the fluid from the first channel, and at least one second substrate of same or different structure as the first single substrate is overlaid on the front surface of the first single substrate.

15. A device comprising:
a first single substrate having a first channel formed on a front surface of the first single substrate, the first channel extending between two openings, and a second channel formed on a rear surface of the first single substrate, the second channel extending between the two openings, each opening extending from the front surface to the rear surface of the first single substrate; and
an information recording layer forming an optical recording medium on at least one of the front and rear surfaces of the first single substrate,
wherein the device has at least one inlet port connected to one of the two openings of the first channel and configured to introduce fluid to the first channel, at least one outlet port connected to another one of the two openings of the first channel and configured to discharge the fluid from the first channel, said at least one inlet port and outlet port are formed at one side of the first single substrate, a predetermined material is disposed on or embedded in the other side of the first single substrate to form the optical recording medium, and the predetermined material is at least one of ceramics, metal or an alloy.

* * * * *